United States Patent
Broderick

(10) Patent No.: US 6,942,840 B1
(45) Date of Patent: Sep. 13, 2005

(54) METHOD FOR REMOVAL AND STABILIZATION OF MERCURY IN MERCURY-CONTAINING GAS STREAMS

(75) Inventor: Thomas E. Broderick, Arvada, CO (US)

(73) Assignee: ADA Technologies, Inc., Littleton, CO (US)

( * ) Notice: Subject to any disclaimer, the term of this patent is extended or adjusted under 35 U.S.C. 154(b) by 75 days.

(21) Appl. No.: 10/253,944

(22) Filed: Sep. 23, 2002

Related U.S. Application Data
(60) Provisional application No. 60/324,667, filed on Sep. 24, 2001.

(51) Int. Cl.$^7$ ............................................. B01D 53/14
(52) U.S. Cl. ......................... 423/101; 95/152; 95/195; 95/234; 96/235; 210/914; 422/168; 423/210; 423/215.5
(58) Field of Search ........................... 422/168; 95/189, 95/195, 196, 197, 205, 234, 152; 96/234, 236, 235; 423/210, 215.5, 99, 101, 103, 104, 106; 210/719, 721, 723, 759, 914, 757, 756, 758

(56) References Cited

U.S. PATENT DOCUMENTS

| | | | |
|---|---|---|---|
| 1,697,095 A | 1/1929 | Turner | |
| 2,145,901 A | 2/1939 | Shoemaker | 210/23 |
| 2,387,496 A | 1/1945 | Greentree | 252/299 |
| 2,860,952 A | 11/1958 | Bergeron et al. | 23/134 |
| 3,194,629 A | 7/1965 | Drelbelbis et al. | 23/2 |
| 3,201,149 A | 8/1965 | Bragg | 285/39 |
| 3,232,033 A | 2/1966 | Williston et al. | 55/387 |
| 3,257,776 A | 6/1966 | Park et al. | 55/72 |
| 3,374,608 A | 3/1968 | Manes | 55/72 |
| 3,499,837 A | 3/1970 | Jaunarajs | 210/59 |
| 3,516,947 A | 6/1970 | Dudzik | 252/439 |

(Continued)

FOREIGN PATENT DOCUMENTS

| | | | |
|---|---|---|---|
| CA | 2173171 | 10/1996 | |
| CA | 2173271 | 2/1999 | |
| DE | 3813 264 A1 | 11/1988 | |
| DE | 41 23907 A1 | 1/1993 | |
| DE | 44 22 468 A1 | 1/1996 | |
| EP | 1 225 967 B1 | 7/2002 | ........... B01D/53/60 |
| JP | 48026672 A | 4/1973 | |
| JP | 51069483 | 6/1976 | |
| WO | WO 0126784 A1 | 4/2001 | ........... B01D/53/60 |
| WO | WO 02/096559 A1 | 5/2001 | |
| WO | WO 03/093518 A1 | 11/2003 | ........... C22B/43/00 |

OTHER PUBLICATIONS

Grant et al. "Grant & Hackh's Chemical Dictionary", New York: McGraw–Hill Book Co., 1987, p. 361.*
U.S. Appl. No. 10/134,178, filed Apr. 26, 2002, Lovell.
U.S. Appl. No. 09/794,577, filed Feb. 27, 2001, Albiston et al.
U.S. Appl. No. 09/997,932, filed Nov. 28, 2001, Broderick et al.
U.S. Appl. No. 10/681,671, filed Oct. 7, 2003, Lovell.
Jan. 20, 2003 print–out of E–watertechnologies' website at http://www.e–watertechnologies.com. regarding Whole House Anion Water Conditioner, 2 pages.

(Continued)

*Primary Examiner*—Duane S. Smith
(74) *Attorney, Agent, or Firm*—Sheridan Ross P.C.

(57) ABSTRACT

The present invention is directed to a process and apparatus for removing and stabilizing mercury from mercury-containing gas streams. A gas stream containing vapor phase elemental and/or speciated mercury is contacted with reagent, such as an oxygen-containing oxidant, in a liquid environment to form a mercury-containing precipitate. The mercury-containing precipitate is kept or placed in solution and reacts with one or more additional reagents to form a solid, stable mercury-containing compound.

57 Claims, 6 Drawing Sheets

U.S. PATENT DOCUMENTS

| | | | |
|---|---|---|---|
| 3,579,947 A | 5/1971 | Kruger | 178/69.5 |
| 3,674,428 A | 7/1972 | Dean et al. | 23/134 |
| 3,677,696 A * | 7/1972 | Bryk et al. | 423/210 |
| 3,740,331 A | 6/1973 | Anderson et al. | 210/53 |
| 3,749,761 A | 7/1973 | Dean et al. | 423/562 |
| 3,755,161 A | 8/1973 | Yokota et al. | 210/36 |
| 3,790,370 A | 2/1974 | Lalancette | 75/108 |
| 3,835,217 A | 9/1974 | Dunsmoor | 423/499 |
| 3,847,598 A * | 11/1974 | Coulter et al. | 75/721 |
| 3,864,327 A | 2/1975 | Marchant | 260/231 A |
| 3,873,581 A | 3/1975 | Fitzpatrick et al. | 260/370 |
| 3,876,451 A | 4/1975 | Zall | 117/62 |
| 3,890,225 A | 6/1975 | Kajiyama | 210/38 |
| 3,935,098 A | 1/1976 | Oda et al. | 210/38 |
| 3,947,354 A | 3/1976 | Swanson et al. | 210/53 |
| 3,948,863 A | 4/1976 | Akamatsu et al. | 260/78 A |
| 3,961,031 A * | 6/1976 | Yasui et al. | 423/210 |
| 3,969,244 A | 7/1976 | Kobayashi et al. | 210/38 B |
| 3,984,606 A | 10/1976 | Morgan | 428/419 |
| 3,994,719 A | 11/1976 | Corte et al. | 75/101 BE |
| 3,999,825 A | 12/1976 | Cannon | 339/15 |
| 4,008,937 A | 2/1977 | Filippi | 339/15 |
| 4,038,071 A * | 7/1977 | Di Bella | 588/224 |
| 4,051,316 A | 9/1977 | Wing et al. | 536/107 |
| 4,053,401 A | 10/1977 | Fukushima et al. | 210/52 |
| 4,069,140 A | 1/1978 | Wunderlich | 208/251 H |
| 4,072,605 A | 2/1978 | Thelander | 210/50 |
| 4,083,783 A | 4/1978 | Wing et al. | 210/54 |
| 4,087,359 A | 5/1978 | Patron et al. | 210/50 |
| 4,094,777 A | 6/1978 | Sugier et al. | 210/32 |
| 4,101,631 A | 7/1978 | Ambrosini et al. | 423/210 |
| 4,102,982 A | 7/1978 | Weir, Jr. | 423/243.1 |
| 4,108,769 A | 8/1978 | Krieg et al. | 210/50 |
| 4,118,243 A | 10/1978 | Sandersara | 106/109 |
| 4,147,626 A * | 4/1979 | Findlay et al. | 210/724 |
| 4,151,077 A | 4/1979 | Nogueira et al. | 210/21 |
| 4,153,556 A | 5/1979 | Riedinger | 210/218 |
| 4,160,730 A * | 7/1979 | Nguyen | 210/718 |
| 4,196,173 A | 4/1980 | deJong et al. | 423/210 |
| 4,230,486 A | 10/1980 | Capuano et al. | 75/81 |
| 4,233,274 A * | 11/1980 | Allgulin | 423/210 |
| 4,238,329 A | 12/1980 | Zievers | 210/36 |
| 4,245,989 A | 1/1981 | Folkenroth et al. | 433/92 |
| 4,249,786 A | 2/1981 | Mahoff | 339/15 |
| 4,256,227 A | 3/1981 | Petrovich | 209/166 |
| 4,256,707 A | 3/1981 | Flynn, Jr. et al. | 423/42 |
| 4,260,494 A | 4/1981 | Dotson et al. | 210/721 |
| 4,273,747 A | 6/1981 | Rasmussen | 423/210 |
| 4,285,564 A | 8/1981 | Spinner | 339/89 C |
| 4,340,623 A | 7/1982 | Justus | 427/361 |
| 4,354,942 A | 10/1982 | Kaczur et al. | 210/712 |
| 4,363,749 A | 12/1982 | Weiss et al. | 252/455 R |
| 4,369,167 A | 1/1983 | Weir, Jr. | 423/210 |
| 4,377,483 A | 3/1983 | Yamashita et al. | 210/670 |
| 4,385,891 A | 5/1983 | Ligotti | 433/92 |
| 4,419,107 A | 12/1983 | Roydhouse | 55/5 |
| 4,443,417 A * | 4/1984 | Wiklund | 423/210 |
| 4,459,370 A | 7/1984 | van der Wal et al. | 502/338 |
| 4,474,896 A | 10/1984 | Chao | 502/216 |
| 4,500,327 A | 2/1985 | Nishino et al. | 55/72 |
| 4,583,999 A * | 4/1986 | Lindahl et al. | 95/199 |
| 4,614,592 A | 9/1986 | Googin et al. | 210/679 |
| 4,654,322 A | 3/1987 | Holbein et al. | 502/403 |
| 4,670,160 A | 6/1987 | Moriya et al. | 210/679 |
| 4,693,731 A * | 9/1987 | Tarakad et al. | 95/188 |
| 4,695,447 A | 9/1987 | Shultz | 423/659 |
| 4,709,118 A | 11/1987 | Yan | 585/820 |
| 4,721,582 A | 1/1988 | Nelson | 252/189 |
| 4,731,187 A | 3/1988 | Moriya et al. | 210/719 |
| 4,752,398 A | 6/1988 | Holbein et al. | 210/679 |
| 4,753,632 A | 6/1988 | Hofmann et al. | 494/43 |
| 4,764,219 A | 8/1988 | Yan | 134/2 |
| 4,764,355 A | 8/1988 | Romey et al. | 423/244 |
| 4,771,030 A | 9/1988 | Audeh | 502/414 |
| 4,786,483 A | 11/1988 | Audeh | 423/210 |
| 4,786,484 A | 11/1988 | Nelson | 423/239 |
| 4,814,091 A | 3/1989 | Napier et al. | 210/665 |
| 4,814,152 A | 3/1989 | Yan | 423/210 |
| 4,834,953 A | 5/1989 | Audeh | 423/210 |
| 4,843,102 A | 6/1989 | Horton | 521/28 |
| 4,844,815 A | 7/1989 | Ader et al. | 210/751 |
| 4,861,493 A * | 8/1989 | Jansen | 210/715 |
| 4,902,662 A | 2/1990 | Toulboat et al. | 502/216 |
| 4,909,926 A | 3/1990 | Yan | 208/253 |
| 4,909,944 A | 3/1990 | Jackson et al. | 210/674 |
| 4,911,825 A | 3/1990 | Roussel et al. | 208/251 R |
| 4,915,818 A | 4/1990 | Yan | 208/251 |
| 4,917,862 A | 4/1990 | Kraw et al. | 423/4 |
| 4,919,826 A | 4/1990 | Alzner | 210/788 |
| 4,933,158 A | 6/1990 | Aritsuka et al. | 423/210 |
| 4,950,408 A | 8/1990 | Duisters et al. | 210/660 |
| 4,962,276 A | 10/1990 | Yan | 585/867 |
| 4,969,995 A | 11/1990 | Jackson et al. | 210/263 |
| 4,985,389 A | 1/1991 | Audeh | 502/516 |
| 4,986,898 A | 1/1991 | Torihata et al. | 208/251 |
| 5,017,135 A | 5/1991 | Meyer | 433/92 |
| 5,034,054 A | 7/1991 | Woodward | 75/388 |
| 5,053,209 A | 10/1991 | Yan | 423/210 |
| 5,062,948 A | 11/1991 | Kawazoe et al. | 208/251 |
| 5,064,626 A | 11/1991 | Johnson et al. | 423/245.1 |
| 5,080,799 A | 1/1992 | Yan | 210/661 |
| 5,085,844 A | 2/1992 | Nowack et al. | 423/245.1 |
| 5,107,060 A | 4/1992 | Yan | 585/823 |
| 5,114,578 A | 5/1992 | Sundström | 210/256 |
| 5,120,515 A | 6/1992 | Audeh et al. | 423/210 |
| 5,154,833 A | 10/1992 | Robinson | 210/664 |
| 5,173,286 A | 12/1992 | Audeh | 423/566.1 |
| 5,192,163 A | 3/1993 | Fleming | 405/128 |
| 5,202,301 A | 4/1993 | McNamara | 502/417 |
| 5,209,773 A | 5/1993 | Audeh et al. | 75/388 |
| 5,225,175 A | 7/1993 | Lyon | 423/235 |
| 5,227,053 A | 7/1993 | Brym | 210/143 |
| 5,238,488 A | 8/1993 | Wilhelm | 75/742 |
| 5,245,106 A | 9/1993 | Cameron et al. | 585/823 |
| 5,248,488 A | 9/1993 | Yan | 423/210 |
| 5,294,417 A * | 3/1994 | Moore et al. | 423/101 |
| 5,298,168 A | 3/1994 | Guess | 210/713 |
| 5,304,693 A | 4/1994 | Boitiaux et al. | 585/648 |
| 5,308,500 A | 5/1994 | Schwarzbach | 210/716 |
| 5,322,628 A | 6/1994 | Yan | 210/673 |
| 5,330,658 A | 7/1994 | Grant et al. | 210/717 |
| 5,336,835 A | 8/1994 | McNamara | 585/820 |
| 5,338,444 A | 8/1994 | van Buren et al. | 210/660 |
| 5,357,002 A | 10/1994 | Lezzi et al. | 525/332.2 |
| 5,369,072 A | 11/1994 | Benjamin et al. | 502/84 |
| 5,370,827 A | 12/1994 | Grant et al. | 588/18 |
| 5,391,217 A | 2/1995 | Zoche | 75/724 |
| 5,409,522 A | 4/1995 | Durham et al. | 75/670 |
| 5,419,884 A | 5/1995 | Weekman et al. | 423/210 |
| 5,421,994 A | 6/1995 | Sarrazin et al. | 208/251 R |
| 5,435,980 A | 7/1995 | Felsvang et al. | |
| 5,437,797 A | 8/1995 | Helmig | 210/669 |
| 5,460,643 A | 10/1995 | Hasenpusch et al. | 95/134 |
| 5,463,167 A | 10/1995 | Ou | 585/823 |
| 5,492,627 A | 2/1996 | Hagen et al. | 210/651 |
| 5,523,067 A | 6/1996 | Markovs | 423/99 |
| 5,536,416 A | 7/1996 | Coltrinari et al. | 210/723 |
| 5,569,436 A | 10/1996 | Lerner | 422/170 |
| 5,577,910 A | 11/1996 | Holland | 433/92 |
| 5,599,515 A | 2/1997 | Misra et al. | 423/101 |
| 5,607,496 A | 3/1997 | Brooks | 75/670 |

| | | | |
|---|---|---|---|
| 5,613,851 A | 3/1997 | Trawöger et al. | 433/92 |
| 5,658,487 A | 8/1997 | Carey et al. | 252/180 |
| 5,667,695 A | 9/1997 | Bedard et al. | 210/681 |
| 5,672,323 A | 9/1997 | Bhat et al. | 422/172 |
| 5,695,726 A | 12/1997 | Lerner | 423/210 |
| 5,741,397 A | 4/1998 | Kraver | 159/25.2 |
| 5,753,125 A | 5/1998 | Kreisler | 210/710 |
| 5,795,159 A | 8/1998 | Ralls et al. | 433/92 |
| 5,797,742 A | 8/1998 | Fraker | 433/92 |
| 5,827,352 A | 10/1998 | Altman et al. | 95/58 |
| 5,846,434 A | 12/1998 | Seaman et al. | 210/724 |
| 5,880,060 A | 3/1999 | Blake et al. | 502/411 |
| 5,885,076 A | 3/1999 | Ralls et al. | 433/92 |
| 5,898,093 A | 4/1999 | Vos | 588/236 |
| 5,900,042 A | 5/1999 | Mendelsohn et al. | 75/742 |
| 5,907,037 A | 5/1999 | Gujral et al. | 536/59 |
| 5,908,559 A | 6/1999 | Kreisler | 210/710 |
| 5,919,001 A | 7/1999 | Lin | 405/128 |
| 5,922,277 A | 7/1999 | Donhoff et al. | 422/1 |
| 5,967,965 A | 10/1999 | Vyshkina et al. | 588/256 |
| 5,976,270 A | 11/1999 | Zelez et al. | 134/28 |
| 5,976,383 A | 11/1999 | Guess et al. | 210/711 |
| 5,986,161 A | 11/1999 | Akae et al. | 588/231 |
| 6,022,216 A | 2/2000 | Cattani | 433/92 |
| 6,024,239 A | 2/2000 | Turner et al. | 220/269 |
| 6,083,306 A | 7/2000 | Cattani | 96/157 |
| 6,083,473 A | 7/2000 | Esquivel et al. | 423/576.8 |
| 6,103,205 A | 8/2000 | Wojtowicz et al. | 423/210 |
| 6,136,281 A | 10/2000 | Meischen et al. | 423/210 |
| 6,139,751 A | 10/2000 | Bogaert et al. | 210/679 |
| 6,153,108 A * | 11/2000 | Klock et al. | 210/722 |
| 6,165,366 A | 12/2000 | Sarangapani | 210/666 |
| 6,214,304 B1 * | 4/2001 | Rosenthal et al. | 423/210 |
| 6,270,679 B1 | 8/2001 | Kreisler | 210/710 |
| 6,274,045 B1 | 8/2001 | Kreisler | 210/710 |
| 6,284,208 B1 * | 9/2001 | Thomassen | 423/210 |
| 6,294,139 B1 * | 9/2001 | Vicard et al. | 423/210 |
| 6,322,613 B1 | 11/2001 | Wojtowicz et al. | 95/107 |
| 6,372,187 B1 | 4/2002 | Madden et al. | 422/171 |
| 6,375,909 B1 | 4/2002 | Dangtran et al. | 423/235 |
| 6,387,276 B1 | 5/2002 | Nikolaidis et al. | 210/719 |
| 6,403,044 B1 | 6/2002 | Litz et al. | 423/101 |
| 6,447,740 B1 * | 9/2002 | Caldwell et al. | 423/210 |
| 6,524,371 B2 | 2/2003 | El-Shoubary et al. | 95/134 |
| 6,533,842 B1 | 3/2003 | Maes et al. | 95/134 |
| 6,534,024 B2 * | 3/2003 | Honjo et al. | 423/210 |
| 6,558,642 B2 | 5/2003 | El-Shoubary et al. | 423/245.3 |
| 6,638,347 B2 | 10/2003 | El-Shoubary et al. | |
| 2001/0007647 A1 * | 7/2001 | Honjo et al. | 423/210 |
| 2003/0099585 A1 * | 5/2003 | Allgulin | 423/210 |
| 2003/0161771 A1 | 8/2003 | Oehr | |
| 2004/0013589 A1 | 1/2004 | Vosteen et al. | |

OTHER PUBLICATIONS

Jan. 20, 2003 print–out of E–watertechnologies' website at http://www.e–watertechnologies.com. regarding Whole House Reverse Osmosis System, 4 pages.

Jan. 20, 2003 print–out of Wholly Water® website at http://www.wholly–water.com regarding The Ultimate Drinking Water Purification System, 9 pages.

Jan. 20, 2003 print–out of Prostar Mechanical Technologies Ltd. website at http://www.prostar–mechanical.com regarding Water Purification Systems and Equipment, 4 pages.

Jan. 20, 2003 print–out of A1 Ultra Pure Drinking Water's website at http://www.a1ultrapure.com/drink.html regarding Drinking Water Systems, 8 pages.

Jan. 21, 2003 print–out of Apyron Technologies' website at http://www.apyron.com/home.html beginning with home page and including The Complete Arsenic Treatment Solution, 15 pages.

Jan. 20, 2003 print–out of USFilter website at http://www.usfilter.com/water regarding GFH™ Granular Ferric Hydroxide Media, 2 pages.

Jan. 20, 2003 print–out of Severn Trent Services at http://www.severntrentservices.com regarding SORB33, 2 pages.

Jan. 20, 2003 print–out of ADI website at http://www.adi.ca regarding Arsenic Removal, 1 page.

Jan. 20, 2003 print–out of Tramfloc, Inc. website at http://www.tramfloc.com regarding Application of ActiGuard AAFS50 to Arsenic Removal, 3 pages.

Jan. 20, 2003 print–out of Waste Technolgoies of Australia Pty. Ltd. (Arsenic Solutions Information Page, Solutions and Resources) at http://www.arsenic–solutions.com regarding Simple Arsenic Removal Process (site under reconstruction), 2 pages.

Jan. 20, 2003 print–out of WRT website at http://wrtnet.com regarding The Z–33™ Arsenic Removal Process, 1 page.

Agion Antimicrobial, Agion Technologies L.L.C., The Most Advanced Antimicrobial Silver Delivery System, An Introduction, 10 page.

Bayer Corporation, Plastics Division, "Wheel Covers, Center Caps Become Revolving Art Forms With New Film Insert Molding Technology," 4 pages.

Brown, et al; "Mercury Measurement and Its Control: What We Know, Have Learned, and Need to Further Investigate;" J. Air & Water Manage. Assoc., pp. 1–97; Jun. 1999.

Gash, et al; "Efficient Recovery of Elemental Mercury from Hg(II)–Contaminated Aqueous Media Using a Redox–Recyclable Ion–Exchange Material;" Environ. Sci. Technol. 1988, 32, 1007–1012.

Dorhout and Strauss; "The Design, Synthesis, and Characterization of Redox–Recyclable Materials for Efficient Extraction of Heavy Element Ions form Aqueous Waste Streams;" 1999 American Chemical Society, pp. 53–68.

Rose, Arthur W., Hawkes, Herbert E., Webb, John S., "Geochemistry in Mineral Exploration," Second Edition, 1979, 3 pgs.

Maximum Separation Systems brochure, 7 pgs.

Maximum Product Information brochure, printed Apr. 14, 2000 from website http://www.amalgamseparators.com, 3 pgs.

Apr. 14, 2000 printout of ISOSEP® found at website http://www.drs.nl, 2 pgs.

Maximum Separation Systems, Inc. Model 2000 Type 4 Amalgam Separator brochure, 1 pg.

Metasys brochure, 2 pgs.

ADA Technologies, Inc. Final Progress Report Entitled "Cleanup of Dental Amalgam Waste to Meet Sewer Discharge Regulations;" Grant No. 1 R43 ES07886–01, Apr. 28, 1997, 43 pgs.

Bindsley; "Dental Office Waste Stream Characterization Study;" Municipality of Metropolitan Seattle, Royal Dental College, Adv. Dent. Res. 6:125–130, Sep. 1991, 60 pgs.

Bill Johnson; Technical Memorandum on "Mercury Source Identification Update; Dental Offices and Human Waste;" EIP Associates; Mar. 2, 1999, 25 pgs.

"Scientific Review of Issues Impacting Dentistry;" Naval Dental Research Institute; vol. 2, No. 1, Jan. 2000, 5 pgs.

Pederson et al.; "The Removal of Mercury from Dental–Operatory Wastewater by Polymer Treatment;" Naval Dental Research Institute, Environmental Health Perspectives vol. 107, No. Jan. 1, 1999, 6 pgs.

Kümmerer et al.; "Mercury Emissions from Dental Chairs by Disinfection;" Institute of Environmental Medicine and Hospital Epidemiology, University Hospital Freiburg, *Chemosphere,* vol. 35, No. 4, pps. 827–833, 1997.
Fan et al.; "Environmental issues in dentistry—mercury*;" International Dental Journal (1997)47, 105–109. *Project Initiated and report approved by FDI Commission.
"Best Management Practices for Dental Waste;" City of Boulder Public Works/Utilities; 9 pgs.
Batchu et al., "Comparison of Particle Size Distributions of Dental Wastewater Under Various Clinical Procedures;" Naval Dental Research Institute Great Lakes, Illinois, 19 pgs.
Cailas et al., "Physico–chemical Properties of Dental Wastewater;" Water Environmental Federation, Chicago, Illinois, Oct. 1994, 11 pgs.
Arenholt–Bindsley and Larsen; "Mercury Levels and Discharge in Waste Water from Dental Clinics;" Waste, Air and Soil Pollution; 86:93–99, Jan. 1996, 8 pgs.
Letzel et al.; "An Estimation of the Size Distribution of Amalgam Particles in Dental Treatment Waste;" J. Dent.Res. 76(3): 780–788; Mar. 1997.
Listing of Abstracts from Int'l Conference "Arsenic in Bangladesh Ground Water: World's Greatest Arsenic Calamity," Feb. 22–28, 1999, 22 pgs.
EPA "Arsenic in Drinking Water: Treatment Technologies for Arsenic Decision Tree, Variances and Exemptions," Jun. 2–3, 1999, 9 pages.
Driehaus, et al., "Granular ferric hydroxide—a new absorbent for the removal of arsenic from natural water," J. Water SRT—Aqua 47, 1998, abstract and pp. 59–68.
Murcott, Susan, Appropriate Remediation Technologies for Arsenic–Contaminated Wells, Massachusetts Institute of Technology, "Arsenic in Bangladesh Ground Water" Wagner College, Staten Island, New York, Feb. 27–28, 1999, 13 pgs.
ADA Technologies, Inc., "Turnkey Arsenic Removal for Small Water Systems," Topic #AF03–265, Proposal #F031–0720, 3 pgs.
Stewart et al., "Stabilization of Radioactively Contaminated Elemental Mercury Wastes," DOE Spectrum 1998 Conference.
Sittig, 1973, Pollutant Removal Handbook: 286–294.
Grant et al., 1987, Grant & Hackh's Chemical Dictionary: 25, 29.
Barth, 1990, The SITE Demonstration of the CHEMFIX Solidification/Stabilization Process at the Portable Equipment Salvage Company Site: 166–170.
Huang et al., 1991, Emissions of Airborne Toxics from Coal–Fired Boilers: Mercury: 13–16.
Superfund Innovative Technology Evaluation, 1992.
Trezek, 1992, Remediation of Heavy Metals in Soils and Sludges: 1–5.
Darnell et al., 1992, Full–Scale Tests of Sulfur Polymer Cement and Non–radioactive Waste in Heated and Unheated Prototypical Containers: iii–A–8.
Blumbach et al., 1992, Sorbalit—A New Economic Approach Reducing Mercury and Dioxin Emissions: 2–20.
Hartenstein, 1992, A Fixed Bed Activated Coke/Carbon Filter as a Final Gas Cleaning Stage Retrofitted for a Hazardous Waste Incineration Plant—The First 6 Months of Operating Experience: 2–16.
Gorin et al., 1994, Final Disposal Options for Mercury/Uranium Mixed Wstes From the Oak Ridge Reservation: iii–21.

Daryl R., 1998, ADA Technologies, Inc. Memorandum.
1998, ADA Process for Stabilizing Radioactively Contaminated Elemental Mercury a Success, VIII (3): 1–4.
Brown, 2000, Stabilization of Mercury Containing Wastes.
2000, Soil Screening Guidance for Radionuclides: User's Guide: i–C–8.
Davis et al., Mercury Mixed Waste Treatment: 13–23.
Darco FGD Activated Carbon for Removal of Mercury and Dioxin From Flue Gas: 1–5.
Conley, Hg Working Group/Treatment Demonstrations [3PCK]: 1–4.
Broderick et al., Mercury Control and Treatment Processes for Solid, Liquid and Gas Streams.
Tyson, 1992, Treatability Study for the Amalgamation of a Radioactively Contaminated Elemental Mercury Waste at the Idaho National Engineering Laboratory.
Faulkner etal., Size Reduction: 132–162.
Roberts, et al., "Stabilization of Radioactively Contaminated Elemental Mercury Wastes," Paper No. 36–6, WM '98, Tucson, Arizona, Mar. 1–5, 1998.
"Appendix B: Arsenic and Clarifications to Compliance and New Source Contaminants Monitoring; Final Rule (66 FR 6976)"; *Environmental Protection Agency;* Aug. 2002; pp. 1–174.
"Arsenic Drinking Water"; *The National Academies Press;* 1999; 5 pp.
"Arsenic in Bangladesh Ground Water: World's Greatest Arsenic Calamity"; *International Conference, Wagner College, Spiro Hall;* Staten Island, NY, USA; Feb. 27–28, 1999; 32 pgs.
"Arsenic in Drinking Water: Treatment Technologies for Arsenic Decision Tree, Variances and Exemptions"; *Environmental Protection Agency;* Jun. 2–3, 1999; pp. 1–9; website: http://www.epa.gov/cgi–bin/epaprintonly.cgi.
"Arsenic Toxicity"; *Agency for Toxic Substances and Disease Registry;* Oct. 2000; pp. 1–42.
"Arsenic Treatment Technologies for Soil, Waste, and Water"; *US Environmental Agency;* Sep. 2002; pp. i–16–4.
Balasubramanian et al.; "Arsenic Removal from Industrial Effluent through Electrocoagulation"; *Chem. Eng. Technol.;* 2001, vol. 24, No. 5; pp. 519–521.
Chwirka et al.; "Removing Arsenic from Groundwater"; *Journal AWWA—Executive Summary;* Mar. 2000, vol. 92, No. 3, 2 pp.; website: http://www.awwa.org/Communications/Archives/I300es4.htm.
Davis; "Aqueous Silica in the Environment: Effects on Iron Hydroxide Surface Chemistry and Implications for Natural and Engineered Systems"; *Masters' Thesis, Virginia Polytechnic Institute and State University;* May 9, 2000; pp. i–30.
"Demonstration Project Summary; Arsenic Treatment Technology Demonstration"; *TAC, Montana University System Water Center;* Mar. 2001; 4 pp.
Driehaus et al.; "Granular Ferric Hydroxide—A New Absorbent for the Removal of Arsenic from Natural Water"; *J. Water SRT—Aqua;* 1998vol. 47, No. 1; pp. 30–35.
"EPA Needs More Stringent for Arsenic in Drinking Water"; *US Water News Online;* Apr. 1999; 3 pgs.; website: http://www.uswaternews.com/archives/arcquality/9eepanee4.htm.
Fields et al.; "Arsenic Removal from Drinking Water by Coagulation/Filtration and Lime Softening Plants"; *National Risk Management Research Laboratory, US Environment Protection Agency in Cincinnati, OH;* Jun. 2000; pp. i–96.

"Future Water Needs in Colorado"; *Colorado State Demographer;* 1994; 1 pg.; website: http://waterknowledge.colostate.edu/future.htm.

Hering et al.; "Arsenic Removal by Ferric Chloride"; *Journal AWWA;* Apr. 1996; pp. 155–167.

Kiura et al.; "Bactericidal Activity of Electrolyzed Acid Water from Solution Containing Sodium Chloride at Low Concentration, in Comparison with that at High Concentration"; *Journal of Microbiological Methods;* 2002, vol. 49, pp. 285–293.

Kraft et al.; "Electrochemical Water Disinfection Part I: Hypochlorite Production from Very Dilute Chloride Solutions"; *Journal of Applied Electrochemistry;* 1999; vol. 29, pp. 861–868.

Lepkowski; "Arsenic Crisis Spurs Scientists"; *C & EN;* May 17, 1999; pp. 45–49.

"List of Drinking Water Contaminants & MCLs"; *US Environmental Protection Agency;* (Last updated Mar. 18, 2004); pp. 1–12 and 1–6.

Mollah et al.; "Electrocoagulation (EC)—Science and Applications"; *Journal of Hazardous Materials,* B84; 2001, pp. 29–41.

Morita et al.; "Disinfection Potential of Electrolyzed Solutions Containing Sodium Chloride at Low Concentrations"; *J Viro Methods;* Mar. 2000; vol. 85(1–2); pp. 163–174.

Nolan; "National Statistical Analysis of Nutrient Concentrations in Ground Water"; *URL:* http://water.usgs.gov/nawga/nutrients/datasets/nutconc2000/; 4 pgs.

"Proven Alternatives for Aboveground Treatment of Arsenic in Groundwater"; *US Environmental Protection Agency;* Oct. 2002; pp. 1–E–2.

"Public Health Statement for Arsenic"; *Agencry fo rToxic Substances and disease Registry*; Sep. 2000; 12 pgs.; website: http://www.atsdr.cdc.gov/ToxProfiles/phs8802.html.

Renk; "Treatment of Hazardous Wastewaters by Electrocoagulation"; *Colorado Hazardous Waste Management Society;* Nov. 6–7, 1989; 12 pgs.

Smith et al.; "Contamination of Drinking–Water by Arsenic in Bangladesh: A Public Health Emergency"; *World Health Organization;* 2000; pp. 1093–1103.

Welch et al.; "Arsenic in Ground–Water Resources of the United States"; *US Geological Survey;* May 2000; 4 pgs.

Woodwell et al.; "Water Efficiency for Your Home"; *Rocky Mountain Institute $3^{rd}$ Edition,* 1995; pp. 1–18.

R.K. Srivastava et al., "Flue Gas Desulfurization: The State of the Art," *J. Air & Waste Manag. Assoc.,* vol. 51 (Dec. 2001), pp. 1676–1688.

Wylecial et al.; "The Activation of Sorbent in a Jet Mill in the Combusion–Gas Sulfur Removal Process"; *Technical University of Czestochowa;* (date unknown); pp. 1–6.

* cited by examiner

| Test # | Purpose | Reagent Concen. (%) | G/L Ratio* (lb/lb) | Avg. Inlet Hg Concen. (mg/m$^3$) | Avg. Outlet Hg Concen. (mg/m$^3$) |
|---|---|---|---|---|---|
| 1 | Hypochlorite (ClO⁻ baseline) | 0.32 | 0.0206 | 33 | <0.010 |
| 2 | ClO⁻ reduced liquid flow | 0.32 | 0.0411 | 29.4 | <0.010 |
| 3 | ClO⁻ reduced reagent conc. | 0.16 | 0.0617 | 26 | <0.010 |
| 4 | ClO⁻ increased gas flow | 0.16 | 0.0617 | 22 | <0.010 |
| 5 | ClO⁻ min. reagent conc. | 0.008 | 0.0822 | 30 | 0.68 |
| 6 | ClO⁻ min. reagent conc. | 0.08 | 0.0822 | 20 | <0.050 |
| 7 | ClO⁻ height of transfer unit | 0.03 | 0.0904 | 25 | N/A |
| 8 | ClO⁻ stress test | 0.06 | 0.0904 | Max 87 | <0.010 |
| 9 | H$_2$O$_2$ reagent | 0.86 | 0.0904 | 36 | ~0.050 |
| 10 | ClO⁻ longevity | 0.16 | 0.0904 | 26 | <0.010 |
| 10a | ClO⁻ min. reagent conc. | 0.10 | 0.0904 | 22 | N/A |
| 11 | KMNO$_4$ reagent | 0.14 | 0.0904 | 30 | ~0.150 |
| 12 | ClO⁻ stress test | 0.32 | 0.0863 | Max 21 | <0.044 |
| 13 | ClO⁻ stress test | 0.32 | 0.0863 | Max 100+ | <0.010 |
| 14 | ClO⁻ high gas flow | 0.03 | 0.1439 | 25 | 0.077 |

*Gas to liquid, calculated on a mass basis

FIG. 3

PREDICTED PERFORMANCE OF FULL-SCALE WET SCRUBBER SYSTEM

| SCRUBBER CONFIGURATION | MERCURY CONCENTRATION (mg/m³) | | | Hg EMISSIONS (lb/yr) FOR AVERAGE GAS |
|---|---|---|---|---|
| | LOW | HIGH | AVERAGE | |
| INLET GAS Hg LOADING | 6,000 | 34,000 | 22,000 | 659 |
| HALF-HEIGHT SCRUBBER | 300 | 1,700 | 1,100 | 33 |
| FULL-HEIGHT SCRUBBER | 6 | 34 | 22 | 0.7 |

RESULTS FROM LEACHATE TESTING

| DESIGNATOR | SOLUTION USED | LEACHABLE MERCURY | LEACHABLE MERCURY IN 40 g SOLIDS | % LEACHABLE MERCURY IN SOLIDS |
|---|---|---|---|---|
| A | STANDARD TCLP SOLUTION | 0.099 ppm | 50g/100ml | 0.002% |
| B | MINE TAILINGS POND WATER (SPIKED WITH 30 PPM CN⁻) | 27 ppm | 1g SOLID | 0.02% |
| C | 300 PPM CN⁻ SOLUTION | 868 ppm | 1g SOLID | 0.6% |

METHOD FOR REMOVAL AND STABILIZATION OF MERCURY IN MERCURY-CONTAINING GAS STREAMS

CROSS REFERENCE TO RELATED APPLICATIONS

The present application claims the benefits under 35 U.S.C.§119(e) of U.S. Provisional Patent Application Ser. No. 60/324,667, filed Sep. 24, 2001, which is incorporated herein by this reference.

GOVERNMENT LICENSE RIGHTS

The U.S. Government has a paid-up license in this invention and the right in limited circumstances to require the patent owner to license others on reasonable terms as provided for by the terms of Contract No. DE-AC21-97MC-32195 awarded by the Department of Energy.

FIELD OF THE INVENTION

The present invention is directed generally to gas treatment processes and specifically to a process for treating mercury-containing gas streams.

BACKGROUND OF THE INVENTION

Because of the toxicity of elemental mercury and environmentally unstable forms of mercury, many environmental regulatory agencies, such as the U.S. Environmental Protection Agency, restrict their disposal and release. While the disposal and release of elemental mercury and many unstable forms of mercury remains a problem, hazardous waste containing such materials are being generated daily by many sources in many forms. One form of potentially hazardous mercury is mercury-containing gas streams, such as off gases or purge gas from various industrial processes.

One source of mercury-containing gas streams is from various processes involved in the extraction and refining of gold. A well documented phenomenon is the affinity of gold for mercury, a fact that has been used in the extraction and refining of gold from ores for many centuries. This natural attraction also means that mercury is often found in gold deposits and is collected and concentrated along with the gold during the extraction and refining process. The mercury is separated from the gold during the refinement process and either is sold as a byproduct or stabilized for storage on-site.

Other sources of mercury-containing gas streams include flue streams from coal-fired and oil-fired power plants, off gas streams from sewage sludge, municipal waste and medical waste incinerators, chlor-alkali plants, Portland Cement Processing, and pulp and paper manufacturing.

Several processes have been employed to remove mercury from a gas stream. One such process is known as a regenerable mercury control system, which exploits a noble metal sorbent to capture both elemental and oxidized forms of mercury. Once saturated with mercury, the sorbent is regenerated and can be re-used to collect mercury from a gas stream. Regenerable noble metal sorbents have been tested on laboratory and pilot-scales, but not on an industry scale. Capital costs for a noble metal sorbent system may not be cost competitive with other mercury control technologies. Degradation in mercury capacity have been noted when noble metal sorbents are used in an oxidizing environment, such as controlling mercury emissions from coal-fired flue gas streams.

Another process has been tested in which the mercury-containing gas stream is introduced into a reactor containing a sulfide solution, such as calcium polysulfide. Mercury in the gas stream would react directly with the polysulfide when oxygen was present in the gas stream. However, the process produces calcium sulfate and mercuric sulfide precipitates, which tend to accumulate in the reactor and eventually cause extreme operational problems.

Another process to remove and stabilize mercury from a gas stream requires the condensation of mercury vapor at extremely low temperatures, leading to the simultaneous condensation of water or the formation of ice, depending on the temperature of the condenser. This creates additional problems because elemental mercury is at least slightly soluble in water and therefore any wastewater from the process must be treated as hazardous.

As such, a need exists for an improved process to remove vapor phase mercury and mercury-containing compounds from a gas stream and to stablilize the reaction product into a solid, stable compound that can be disposed of as a non-hazardous waste.

SUMMARY OF THE INVENTION

The present invention is directed to a process and apparatus for converting vapor-phase mercury-containing compounds into solid particles, such as a precipitant, and/or forming stable mercury-containing materials from the mercury-containing particles.

In one embodiment of the invention, a gas stream containing vapor-phase elemental and/or speciated mercury is contacted with a liquid in a device such as a scrubber. A reagent is added to the liquid in the scrubber to convert the elemental mercury to a mercury-containing precipitate.

In another embodiment of the invention, a gas stream containing vapor-phase elemental and/or speciated mercury is contacted with a liquid having an oxygen-containing oxidant to form a mercury-containing precipitate.

In another embodiment of the invention, a gas stream containing vapor-phase elemental and/or speciated mercury is contacted with one or more of a peroxygen compound, a hypochlorite, a chlorate, a perchlorate, persulfate, iodine, iodide, hypoiodite, iodate, periodate, permanganate, and hydrogen peroxide to form a mercury-containing precipitate.

In another embodiment of the invention, a gas stream containing vapor-phase elemental and/or speciated mercury is contacted with a reagent in a liquid environment having an inert packing material to provide sufficient surface area for contact between the gas stream and the reagent. Most of the mercury from the gas stream is removed and most of the removed mercury is in the form of a precipitate.

In yet another embodiment of the invention, a gas stream containing vapor-phase elemental and/or speciated mercury is contacted with reagent in a liquid environment to form a mercury-containing precipitate. The mercury-containing precipitate is maintained or placed in solution and reacts with one or more additional reagents to form a stable, non-hazardous mercury-containing solid.

In yet another embodiment of the invention, a gas stream containing vapor-phase elemental and/or speciated mercury is contacted with an oxygen-containing oxidant to form a mercury-containing precipitate. The mercury-containing precipitate is maintained or placed in solution and reacts with a reactive sulfide to form a stable, non-hazardous mercury-containing solid.

In yet another embodiment of the invention, a gas stream containing vapor-phase elemental and/or speciated mercury is contacted with an oxygen-containing oxidant to form a mercury-containing precipitate. The mercury-containing precipitate is maintained or placed in solution and subjected to a series of reactions to neutralize remaining oxidants, to form a stable, non-hazardous mercury-containing solid.

In yet another embodiment of the invention, a gas stream containing vapor-phase elemental and/or speciated mercury is contacted with an oxygen-containing oxidant in a continuous reaction to form a mercury-containing precipitate. The mercury-containing precipitate is bled out in a solution and subjected to a series of reactions to neutralize most of any remaining oxidants, to form a stable, non-hazardous mercury-containing solid and to scavenge one or more byproducts of the reactions.

The process and apparatus can have a number of benefits. For example, the process and apparatus can remove most, if not all, of the vapor-phase mercury from the gas stream and convert most, if not all, of the removed mercury to a non-hazardous solid compound. The process can be performed using conventional component devices on a batch, semi-continuous or continuous basis. The process is therefore readily scalable using components known to those in the art.

BRIEF DESCRIPTION OF THE DRAWINGS

FIG. 3 is a chart depicting a summary of scrubber test conditions and results;

DETAILED DESCRIPTION

Figure 1:
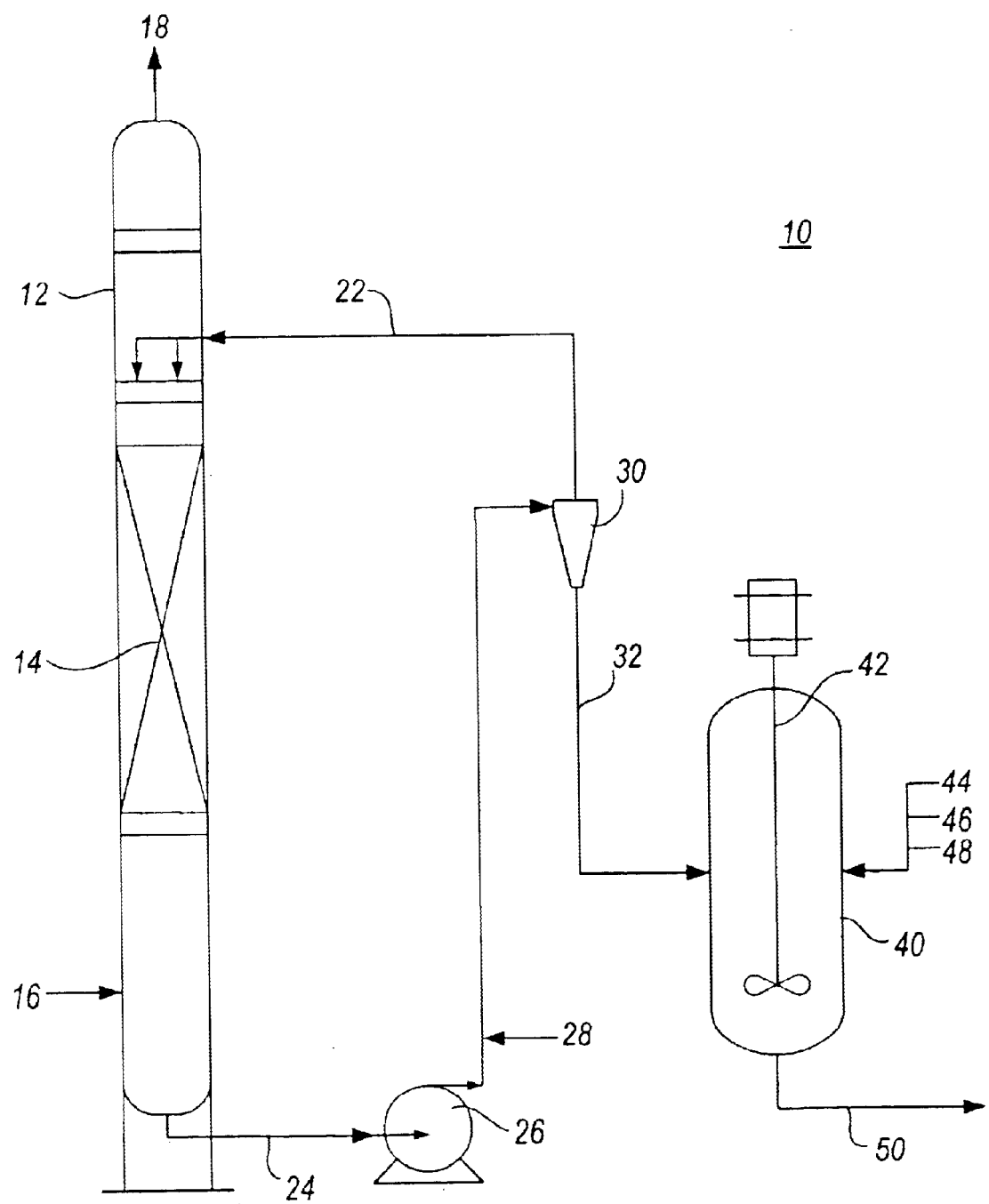
FIG. 1 is a process flow diagram of a preferred embodiment of the present invention.

The present invention is directed generally to gas treatment processes and specifically to a process and apparatus for treating mercury-containing gas streams. In general, the invention is a method and apparatus to remove and stabilize even trace quantities of vapor phase elemental mercury and/or speciated mercury (collectively "vapor-phase mercury") in mercury-containing compounds in a gas stream by contacting the mercury-containing gas stream with a reagent to precipitate the mercury and by reacting the mercury-containing precipitate with one or more additional reagents to form a solid, stable, non-hazardous mercury-containing compound.

While not wishing to be bound by any theory, since the mercury is captured from the gas stream as a solid, the chemical equilibrium in the liquid is essentially unaffected by the reaction and a nearly constant reaction rate is maintained during treatment of the gas stream until the reagent is nearly depleted. This feature of the process allows the generation of a constant outlet mercury concentration regardless of inlet loading. That is, the equilibrium of the solution does not become a process limitation, e.g., by saturating the liquid and limiting the amount of mercury being removed from the vapor phase. Also, because the captured mercury is a solid, revolatilization of mercury back into the vapor phase is greatly reduced.

The invention may be applied in any number of applications in which vapor-phase mercury is desired to be removed from a gas stream and/or stabilized for disposal, including purge gas streams used to regenerate mercury-capturing sorbent materials, flue gas streams from coal-fired electric generating plants or off gas streams from incinerators.

In one embodiment of the invention, a mercury-containing gas stream is contacted with a liquid, oxygen-containing oxidizing agent to precipitate and solubilize elemental mercury and mercury species in mercury-containing compounds. The mercury-containing solution is then treated with a reactive sulfide to promote a chemical reaction between the sulfur and the mercury/mercury-containing compounds to form a stable, non-hazardous mercury solid. After separation from the liquid, the stable mercury solid can be disposed as a non-hazardous waste. Also, with most of the mercury removed, the gas stream may be vented to the atmosphere without additional treatment for mercury.

The gas stream can be any gas stream containing quantities of mercury and/or mercury-containing compounds in the vapor phase. The mercury can be elemental or speciated, including, e.g., in the case of off gas during the regeneration of mercury sorbent materials, $HgCl_2$, $HgSO_4$, $HgNO_3$, and $HgO$. The partial pressures of the elemental mercury and the speciated mercury may be as little as $7\times10^{-6}$ mm Hg (100 $\mu g/m^3$) to as much as the saturation level, depending on the particular gas stream and the speciation of mercury. In a typical off gas stream during regeneration of mercury sorbent materials, the gas stream may comprise elemental mercury at about $3\times10^{-3}$ mm Hg (32 $mg/m^3$). Regenerable gas streams for noble metal sorbents may comprise of elemental mercury at about $9\times10^{-3}$ mm Hg (90 $mg/m^3$).

The gas stream temperature preferably is in the range of approximately freezing to approximately 300° F., and more preferably in the range of approximately 50° F. to approximately 130° F., and even more preferably approximately ambient. If the temperature of the gas stream exceeds the boiling point of the liquid reagent, a condenser or cooler may be used to decrease the temperature of the gas stream to maintain a favorable liquid/gas interface in the scrubber.

The gas stream flow rate is dependent on the capacity of the scrubber, including the flow rate of the liquid reagent. In a preferred embodiment of a scrubber having a 15 foot scrubbing zone, a gas stream flow rate of approximately 800 cubic feet per minute to approximately 1200 cubic feet per minute is preferred and approximately 1,000 cubic feet per minute is more preferred. Larger or smaller tower may alternatively be employed.

The reagent can be any material capable of reacting with the vapor phase mercury and/or the mercury in the mercury-containing compound to form a mercury-containing precipitate, preferably a mercuric oxide precipitate. A preferred reagent is an oxygen-containing oxidant, such as a hypochlorite, sodium hypochlorite, calcium hypochlorite, hydrogen peroxide, peroxygen compounds, potassium permaganate, persulfate, chlorates, perchlorates, sodium iodite, sodium hypoiodite, sodium periodite, and, more preferably, is sodium hypochlorite. Solution of iodine and/or sodium iodide may also be used.

The concentration of reagent in the feed stream is preferably approximately 1% to approximately 20% by weight, and more preferably approximately 4% to approximately 6% by weight. In the scrubber, the concentration of reagent will vary as the desired reactions take place. Preferably, the concentration of reagent in the scrubber at the initial contact with the mercury-containing gas stream is approximately 0.1% to approximately 1%, more preferably approximately 0.1% to approximately 0.5%, and even more preferably approximately 0.15%. The concentration of reagent in the scrubber preferably is maintained at sufficient levels to draw substantially all of the elemental and speciated mercury out of the gas stream, preferably in a continuous process.

The gas stream and the reagent are introduced into a scrubber that provides sufficient physical contact between the gas stream and the reagent for the desired reactions to occur. A variety of types and shapes of scrubber may be used, including a fixed bed, fluidized bed, random packed bed, and structured packed bed. In a preferred embodiment, the scrubber is a packed vertical column at least partially filled with inert packing material having sufficient surface area to facilitate the contact between the liquid and gas streams and to promote the desired reactions. In a preferred vertical tower of approximately 20 feet, the packing material preferably should have a height of at least 15 feet. Plastic packing material is preferred due to being chemically inert and readily commercially available. Plastic packing material can be used generally in gas streams having temperatures less than approximately 180° F. In general, the size, shape and quantity of the packing material is not limited by the formation of the mercury-containing precipitate. That is, the amount and size of mercury-containing precipitate formed is relatively small and is washed off the packing material by the flow of the liquid reagent. An in-line filter may be incorporated into the equipment design to capture large material that may plug the openings of the packing material.

Preferably, the gas stream and the liquid reagent are introduced into the scrubber in such a manner as to provide a counter current flow. More preferably, the inlet of the gas stream is at or near the bottom of the packed section of a vertical scrubber and the outlet is at or near the top, while the inlet of the liquid reagent is at or near the top. This arrangement results in a counter current flow as the liquid reagent falls down the scrubber and the gas flows upward.

In the case of a preferred embodiment of using sodium hypochlorite (NaOCl) as a liquid reagent, it is believed that the following reactions occur within the scrubber to produce a mercuric oxide solid.

| | $E$ |
|---|---|
| $Hg + 2OH^- \rightarrow HgO + H_2O + 2e^-$ | $-0.098$ |
| $ClO^- + H_2O + 2e^- \rightarrow Cl^- + 2OH^-$ | $+0.890$ |
| $Hg + ClO^- \rightarrow HgO + Cl^-$ | $+0.792$ |

The equilibrium of the above reactions can be monitored to promote the formation of the mercuric oxide solid. Preferably, an electrode capable of measuring the oxidation/reduction potential is inserted into the scrubber to monitor the oxidation potential of the scrubber liquid stream. When the oxidation potential of the liquid reagent crosses into a threshold range, preferably from approximately 610 mV to approximately 620 mV for a hypochlorite reagent, additional reagent can be injected, if the reaction is desired to proceed. Such an intermittent, measured injection of additional reagent allows the process to be continuous, if desired.

Also, the pH of the liquid stream interface can affect the equilibrium chemistry. Preferably, an electrode capable of measuring pH is also inserted into the scrubber to monitor the pH of the liquid/gas stream interface. When the pH of the liquid/gas stream interface crosses into a threshold range, preferably from approximately 7 to approximately 9 for a hypochlorite reagent, additional reagent or a base solution can be injected, if the reaction is desired to proceed. Again, such an intermittent, measured injection of additional reagent or base solution allows the process to be continuous, if desired.

The ratio of the mass flow rate of the liquid stream to the mass flow rate of the gas reagent may be adjusted to improve performance of the scrubber. The liquid/gas ratio generally is dependent on the reagent concentration and preferably is as low as possible while still removing mercury from the gas stream to the degree desired. The liquid/gas ratio may in adjusted in several ways, e.g., by changing the pump circulation rate or spraying more or less liquor into the scrubber, or by changing the gas feed rate. In a preferred embodiment of a hypochlorite reagent, it is preferred to use a liquid/gas ratio of no more than about 20 lb/lb, and preferably from about 5 lb/lb to about 15 lb/lb, and even more preferably approximately 10 lb/lb. Stated alternatively as a gas/liquid ratio, it is preferred to use a gas/liquid ratio of at least about 0.05 lb/lb, more preferably about 0.07 lb/lb to about 0.2 lb/lb and even more preferably about 0.1 lb/lb.

The liquid reagent scrubs the vapor phase mercury and/or the mercury species of the mercury-containing compounds from the gas stream by forming mercury precipitates. The liquid reagent typically removes at least about 50% of the vapor-phase mercury from the incoming gas stream, more typically at least about 75% of the vapor-phase mercury, and even more typically at least about 95% of the vapor-phase mercury. As demonstrated in testing summarized below, the invention is capable of removing approximately 99.9% of the mercury from the gas stream. In a preferred embodiment, the process is capable of removing sufficient amounts of mercury from the gas stream that the remaining gas stream is compliant with pertinent OSHA and MSHA regulations and can pass directly from the scrubber and be vented without further treatment for mercury, whether elemental or speciated. For example, the vented off-gas typically contains less than approximately 0.03 mg/m$^3$ of vapor-phase mercury remaining from incoming streams containing approximately 1.5 mg/m$^3$ to approximately 40 mg/m$^3$ of vapor-phase mercury.

The liquid reagent containing the mercury-containing precipitate may be treated in a number of ways. Because of the relatively small amounts of mercury being removed from the gas stream, the mercury-containing precipitate generally need not be removed as it forms. Preferably, the solution in the scrubber is monitored and, over time, all or part of the solution is bled out of the scrubber to remove all or part of the mercury precipitate. As such, the process can be batch, semi-continuous or preferably continuous, e.g., by adding fresh liquid reagent as part or all of the mercury-containing solution is removed.

The solution removed from the scrubber may contain mercury in solution or slurry, typically in a solid form or in a dissolved form. Preferably, at least most of the mercury in this scrubber outlet solution is in solid form, and more preferably at least about 50% of the mercury in such solution is in solid form.

The mercury-containing precipitate may be separated from the solution in a variety of ways, including evaporation, filtering, centrifuge separation, and hydroclone. In a preferred embodiment, the mercury-containing precipitate containing solution is bled from the vessel, passed through a filter to separate the mercury precipitate, and recycled to the scrubber. The amount of mercury-containing precipitate removed from the solution depends on the particulate size distribution and the filter method and media used. Periodically, the mercury-containing precipitate that accumulates on the filter can be backwashed to return it into a solution for further processing. This filtering process can be batch, semi-continuous or preferably continuous.

With a substantial amount of the mercury-containing precipitate separated from the solution, the solution may be returned to the scrubber, with additional reagent added, if desired or needed, for additional pass through the scrubber. Preferably, the solution removed from the separator contains no more than approximately 50% mercury.

Preferably, the mercury-containing precipitate is maintained or placed in solution or slurry and introduced into a reaction vessel in an environment to promote a chemical reaction or chemical reactions to form a stable, non-hazardous solid mercury compound. The concentration of mercury in this solution or slurry can vary significantly, and typically is in the range of approximately 1%, and the solids content of the slurry is typically from approximately 10% to approximately 50% by volume. The mercury solids typically constitute most, if not all, of the solids in the slurry and more typically constitute at least about 75 weight % of all of the solids.

Generally, the mercury in the slurry is in the form of a compound of oxygen and mercury, which is generally a mercuric oxide. For example, where the mercury-containing gas stream is scrubbed with liquid hypochlorite, a resulting precipitate is mercury oxide, HgO(s). In this embodiment, the mercury-containing solution can be introduced into a reaction vessel with a reactive sulfur-containing compound to form mercuric sulfide, HgS, a non-soluble, stable, non-hazardous solid that can be disposed or released as non-hazardous waste.

Any oxidizing agent remaining in the mercury-containing solution may promote the re-oxidation of HgS, the desired end product. As such, preferably a first treatment step in the reaction vessel is the addition of a reducing agent capable of neutralizing any remaining oxidizing agent and inhibiting this re-oxidation. Suitable reducing agents can include sodium sulfite, sodium hydrosulfite, and preferably is oxalic acid. The equilibrium chemistry for a preferred embodiment of using hypochlorite is as follows.

$$
\begin{array}{ll}
 & E \\
ClO^- + 2H^+ + 2e^- \rightarrow Cl^- + H_2O & +1.49 \\
H_2C_2O_4 \rightarrow 2H^+ + 2CO_2 + 2e^- & +0.49 \\
\hline
ClO^- + H_2C_2O_4 \rightarrow Cl^- + 2CO_2 + H_2O & +1.98
\end{array}
$$

In this embodiment, hypochlorite, the oxidizing agent, is neutralized with the end products being sodium and chloride ions, carbon dioxide and water.

The equilibrium chemistry to neutralize remaining oxidizing agents can also be monitored and controlled by the pH of the solution, preferably through the use of a pH electrode inserted into the reaction vessel. Reducing agent is added to drive the equilibrium to neutralize the oxidizing agent. The concentration of the reducing agent generally is dependent on availability, and preferably is greater than approximately 10%. The initial pH of the solution is typically at least about pH 8. When the pH of the solution is reduced to approximately 6, the oxidizing agent has been effectively neutralized and addition of the reducing agent is terminated.

With the oxidizing agent removed from the mercury-containing solution, the mercury-containing precipitate can be stabilized. In a preferred embodiment, a reactive sulfide is next added to the mercury-containing solution to form mercuric sulfide, HgS, among other things. The equilibrium equation for such a reaction is as follows.

$$
\begin{array}{ll}
HgO + H_2O + 2e^- \rightarrow Hg + 2OH^- & +0.098E \\
S_{-2} + Hg \rightarrow HgS(black) + 2e^- & +0.690 \\
\hline
HgO + S^{-2} + H_2O \rightarrow HgS(black) + 2OH^- & +0.788E
\end{array}
$$

As this reaction proceeds, the pH of the solution begins to increase. When the pH of the solution reaches a threshold range, preferably from approximately 9 to approximately 11, and more preferably approximately 10, the available mercury compounds have been converted to mercuric sulfide.

The reactive sulfur-containing compound can be any sulfur-containing compound (other than a polysulfide) that forms an amalgam with or otherwise forms an insoluble compound with mercury in an aqueous solution. More preferably, the compound is an inorganic sulfide, an alkali metal hydrogen sulfide, a mercaptan, an alkali metal sulfide, hydrogen sulfide gas or mixtures thereof. The reactive sulfur-containing compound is preferably added to the feed material in the form of a liquid. Addition of the compound is terminated when the pH of the solution reaches approximately 10.

It is also preferred to scavenge excess sulfide from the solution, which can be accomplished by a variety of ways, including by the use of sulfide scavengers such as a metal salt, ferrous sulfate, ferric sulfate, cuprous sulfate, cupric sulfate, ferrous chloride, ferric chloride, stannous chloride, stannic chloride, cuprous chloride, cupric chloride and mixtures thereof. In a preferred embodiment, ferrous sulfate (FeSO$_4$) or ferric sulfate (Fe$_2$(SO$_4$)$_3$) is added. The amount of sulfide scavenger to be added is dependent on the amount of unreacted sulfide. In a typical application, the sulfide scavenger would be added in a liquid form. Again, a pH electrode can be utilized to monitor the reaction. When the pH of the solution drops to the desired threshold level of approximately 7.5 to approximately 5.5, and more preferably to approximately 7, the reaction is stopped. In a preferred embodiment of adding ferric sulfate, the reaction involved is believed to be as follows:

$$Fe_2(SO_4)_3 + 3S^{-2} \rightarrow Fe_2S_3 + 3SO_4^{-2}$$

In this embodiment, the tested scrubber liquid solution may contain relatively small amounts of mercuric sulfide, unconsumed sulfide, iron sulfide, sulfate ions, perhaps some unreacted mercury or other forms of mercury and water. This treated scrubber liquid solution may be subjected to further processing to separate the mercuric sulfide and/or other solids by a variety of ways, including flocculating agents, filtering, and centrifuging. The water can be recycled to the scrubber.

FIG. 1 depicts a scrubber system 10 in a preferred embodiment of the present invention. A stripping column 12 includes a packed bed 14, gas inlet 16, gas outlet 18, liquid reagent inlet 22 and liquid outlet 24. Liquid reagent is introduced into the stripping column through reagent inlet 22 and falls down the column through packed bed 14 and towards the liquid outlet 24. Mercury-containing gas stream is introduced into the stripping column 12 through gas inlet 16 and moves upward through the packed bed 14 towards the gas outlet 18. The packed bed 14 contains packing material (not shown) that provides an inert surface area to facilitate the physical contact and chemical reaction between the liquid reagent and the mercury-containing gas stream.

As the gas moves through the packed bed 14, the liquid reagent reacts with the elemental mercury and the mercury species from the gas stream and forms one or more mercury-containing precipitates. The gas reaching the gas outlet 18 is substantially free of mercury. If, for some reason, the outlet gas contains more mercury than desired, the outlet gas could be recycled and passed through the stripping column additional times, as necessary. To increase mercury capture efficiency, the process parameters may be adjusted, e.g., by increasing the liquid to gas ratio or increasing the concentration of oxidizing reagent in the scrubber liquid.

As the liquid reagent flows towards the liquid outlet 24, the relatively small amounts of mercury-containing precipitates are carried along and removed from the stripping column 12. A recirculating pump 26 can be used to pump the liquid outlet stream to a separator 30. After the mercury-containing precipitate is removed by the separator 30, the remaining liquid reagent may be re-introduced into the stripping column through liquid reagent inlet 22. Additional liquid reagent may be added to the liquid reagent stream as needed, e.g., from liquid reagent source 28.

The separator also generates an initial slurry 32, which contains a portion of the mercury-containing precipitates. The initial slurry 32 is introduced into a reaction vessel 40 with a stirring mechanism 42, where the mercury-containing precipitates are reacted with one or more reagents to form a stable mercury solid that can be disposed or released as a non-hazardous waste material. A first reaction reagent 44 is introduced into the reaction vessel 40 to neutralize any remaining hypochlorite (oxidizing agent), as set forth in more detail above. After that reaction is satisfactorily completed, a second reaction reagent 46 is introduced into the reaction vessel 40 to convert the mercury species in the initial slurry 32 into a stable mercury solid, such as mercuric sulfide. After that reaction is satisfactorily completed, a third reaction reagent 48 is introduced into the reaction vessel 40 to scavenge any remaining sulfide ions. The resulting product slurry 50 is removed from the reaction vessel 40, which is then prepared for additional initial slurry 32 from the separator.

In this embodiment, the stripping column 12 can operate continuously, particularly since the size and amount of mercury-containing precipitates being formed is relatively small. That is, the mercury-containing precipitates produced in the stripping column 12 and separated in the separator 30 are in sufficiently small amounts that the reaction vessel can operate in batch mode, as described above, and process a batch of initial slurry 32 before the separator 30 is required to release additional initial slurry 32.

EXAMPLES

A test apparatus was built to evaluate the process. It consisted of a 4 inch diameter ×36 inch high polycarbonate tube, 24 inch depth of 10 mm 316 SS packing (Jaeger Interpack™), packing support, gear pump to supply the scrubber solution, a liquid distribution system, and a method to supply mercury vapor-laden gas (nitrogen) to the scrubber column. The reservoir of the scrubber was filled with water and commercial grade sodium hypochlorite solution in a 10:1 volume ratio. Nitrogen gas was injected at the bottom of the column through a ½ inch diameter stainless steel tube turned downwards. The nitrogen gas was doped with mercury vapor by either passing the gas stream over a permeation tube containing elemental mercury or mercuric chloride, or by volatilizing mercury compounds from sorbent material. In the latter case, the sorbent materials were heated to evolve the mercury. Contact time of the gas with the reagent liquid was controlled by the height of the column packing in the scrubber and the flow rate of gas. Temperature of the scrubber liquid was controlled to minimize the re-volatilization of mercury from the scrubber solution. Prior to entering the column, the mercury-containing gas was passed through a coil cooled with ice. Using this method, the scrubber liquid temperature was maintained at 80° F. After the gas passed through the scrubber, the gas was again cooled to promote condensation of water in the gas. Condensed liquid was returned to the scrubber reservoir.

Once the mercury compound reacted with the oxidizing solution, a slipstream from the scrubber was directed to a second reaction chamber where a series of chemicals take place. In the first reaction, oxalic acid was added to the scrubber liquid to react with excess sodium hypochlorite. It is believed that the oxidation-reduction reaction converted the sodium hypochlorite ions (NaClO) to sodium ($Na^+$) and chloride ions ($Cl^-$) while oxidizing the oxalate ions ($C_2O_4^{-2}$) to carbon dioxide gas and water. The extent of reaction was measured by the pH of the solution. Sufficient crystals of oxalic acid were added to bring the pH of the solution to a neutral (pH=7) condition.

Next, a source of sulfide ions is added. The source of sulfide ions can be from calcium polysulfide (CaSx), sodium sulfide ($Na_2S$), or from complexing agents such as dimethlydithiocarbamate, diethyldithiocarbamate or other commercial carbamates. In this reaction, the mercury was reacted with the sulfide source. In the case of CaSx and $Na_2S$, it is believed that the mercury reacted with the sulfide source to yield HgS. For the case where a carbamate solution is added, it is believed that the solubilized mercury complexes with the carbamate ions. The amount of sulfide added can be calculated if the mercury content in the scrubber liquid has been determined through a chemical analysis, or added in sufficient quantity to raise the pH of the solution to a pH of 8.

Caution should be exercised when the sulfide is added, especially where CaSx or $Na_2S$ are used, since excess sulfide ions can react with the HgS precipitate to give mercury polysulfide ($HgS_2$). Mercury polysulfide is highly soluble in aqueous solutions and, if present, will leach into the TCLP solution. For this reason, a third reaction preferably is used to remove excess sulfide ions with iron ions. Iron ions that have been used include ferrous sulfate ($FeSO_4$) and ferric sulfate ($Fe_2(SO_4)_3$). A solution (~10% w/v) of the iron salt was prepared and added drop wise to the solution. When added to the solution, iron sulfide was formed, which is a deep black precipitate. Again, pH of the solution was monitored and sufficient amount of iron solution was added to bring the pH of the solution to a neutral (pH=7) condition.

Finally, the solution was cleared by adding a flocculant chemical to drop out calcium sulfate, mercuric sulfide, and iron sulfide. In laboratory tests, cationic polymer flocculant sold by CIBA known as Magnafloc 351 (formerly sold by Allied Colloid as Percol 351) was used. About 1 ml of a 1% (w/v) solution of the Magnafloc was added to 150 ml of the scrubber liquid. Mercury and other solids formed from these reactions were separated from the supernate using a Buckner funnel. The clear supernate liquid can be recycled to the gas scrubber with the addition of sodium hypochlorite, or directed to an evaporative pond or tailings pond.

In the case where the wet scrubber is to be used in the mining industry and/or where chloride ions are a concern, the treated scrubber liquid can be further treated to remove chloride ions generated in the treatment process. By the addition of silver nitrate ($AgNO_3$) to the scrubber solution, silver chloride (AgCl), a highly insoluble white precipitate is formed.

Figure 2:
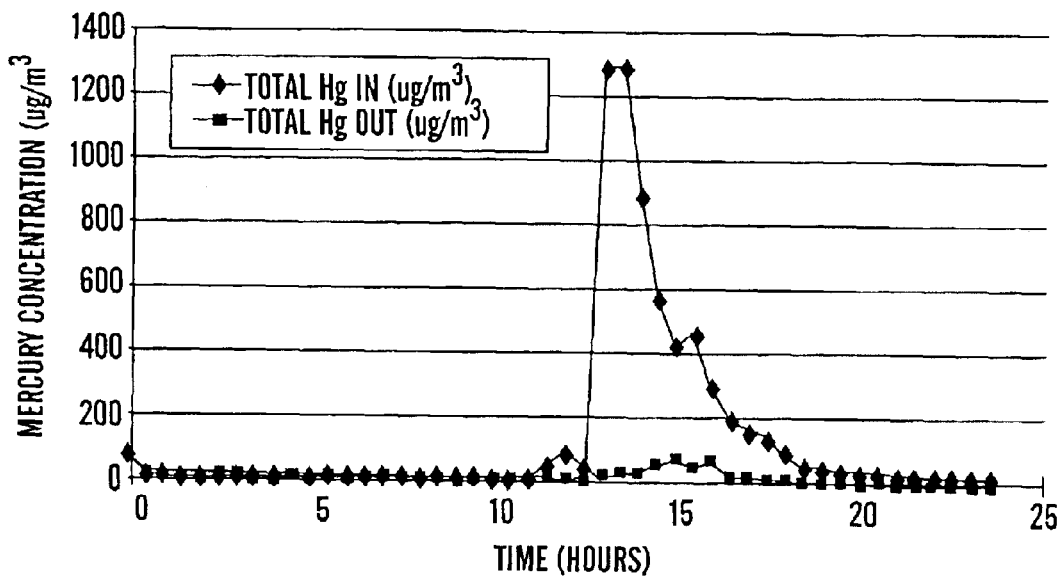
FIG. 2 is a graph depicting scrubber performance.

The ability of the invention to remove vapor-phase mercury was evaluated by measuring the mercury content of the nitrogen gas stream before and after contact with the oxidizing liquid. The ADA continuous mercury analyzer was used to monitor the elemental mercury content of the treated gas stream. This measurement indicated steady-state removal down to a level below 50 $\mu g/m^3$, near the threshold of measurement for the instrument. The output of the analyzer is shown in FIG. 2. The sample labeled "Total Hg In" is a diluted sample of the mercury-doped nitrogen gas stream supplied to the reactor. The trace section labeled "Total Hg Out" is the instrument output when switched to sample the nitrogen gas at the outlet of the scrubber. The measurements indicate removal approaching 100% (within measurement threshold of the instrument) of the elemental mercury from the treated gas stream.

Scrubber liquid from 10 experiments have been treated in the method described above. Treated liquids were tested for leachable mercury EPA Method 241. Analysis of the liquids showed all solutions had less than 25 ppb leachable mercury. Mercury containing solids from several experiments were combined and submitted for TCLP analysis per EPA Method 1311. Results showed less than 200 ppb leachable mercury from the solids, therefore, passed the TCLP standard for mercury.

A pilot plant wet scrubber also was installed for use in evaluating the application of the invention to the regeneration of kiln off gas slipstream. This pilot plant was designed for a nominal feed gas flow rate of 20 actual cubic feet per minute, and consisted of a PVC pipe column of 8 inches in diameter filled with a commercial packing material (Jaeger Tri-Pack) to obtain a four foot active gas/liquid contact height. The column was operated in a countercurrent mode, with gas entering at the bottom and exiting at the top, and the scrubbing liquid sprayed into the top of the column, and cascading down the packing to a reservoir section at the bottom. The pilot was designed to allow flow control of both the gas and liquid supplied to the packed tower, so that the effect of changes in liquid to gas ratio could be evaluated in the test matrix. Tests were also run over a range of scrubber liquor concentrations to determine the optimum composition for this particular feed gas while minimizing reagent consumption.

The three major parameters evaluated in the testing of the wet scrubber system were the concentration of reagent used in the scrubbing solution, the liquid to gas ratio of the scrubber column, and the type of reagent used in the scrubbing solution. For optimum operating conditions of the pilot wet scrubber, the mercury concentration in the outlet was consistently less than 20 micrograms per cubic meter, representing mercury removal in the scrubber of greater than 99.9%. This typical outlet mercury value is well below 50 micrograms per cubic meter, the MSHA 8-hour time-weighted average for worker exposure and the EPA limit for mercury emissions from municipal waste incinerators. In other words, after treatment in the scrubber, the exhaust gas could be released to the interior of the regeneration kiln facility without violation of MSHA worker exposure limits for mercury. The treated gas stream would also satisfy current EPA mercury emissions limits for municipal waste incinerators.

The gas-to-liquid ratios run in the matrix varied from a minimum of 0.02 lb/lb to a maximum of 0.144 lb/lb, for a range factor of about seven. Reagent concentrations in the scrubbing liquor ranged from 0.008% to a high of 0.32%, creating a range of about 40 in the amount of reagent added to the scrubbing solution. Three different oxidizers were evaluated, sodium hypochlorite (common bleach), hydrogen peroxide, and potassium permanganate. Of these, the sodium hypochlorite is by far the cheapest and best performing reagent for use in this application.

Scrubber operating conditions and results of the wet scrubber tests are summarized in FIG. 3. Mercury concentrations in the inlet gas stream were seen to vary between 20 and about 35 milligrams per cubic meter, indicating that the feed to the wet scrubber was saturated with respect to vapor-phase mercury. The temperature of the inlet gas stream varied somewhat over many of the tests as the test time extended into the nighttime hours, when the cooling water source would cool down, with corresponding reduction in the feed gas and reduction in the mercury concentration as the saturation temperature dropped.

Several observations can be made for the results shown in FIG. 3. First, the hypochlorite reagent showed consistent removal of virtually all the mercury in the feed gas stream for a range of reagent concentrations in the scrubbing liquor, down to a concentration of less than 0.10%. This represented the removal of more than 99.9% of the mercury in the feed gas resulting in a mercury concentration in the treated gas stream that was significantly less than the MSHA maximum 8-hour time-weighted average value for mercury in the workplace. Many of the tests later in the matrix were designed to optimize the performance of the hypochlorite scrubbing system by evaluating operation at increased gas to liquid ratios and reduced reagent concentrations in the scrubbing liquor. Second, the alternate reagents tested, hydrogen peroxide and potassium permanganate, both successfully removed most of the mercury in the feed gas stream, but not as well relative to sodium hypochlorite. These results confirmed data from other laboratory testing. Third, the hypochlorite scrubber configuration was able to handle spikes in the inlet mercury concentration to levels as high as 87 milligrams per cubic meter, for the periods of time at which such input levels could be sustained (on the order of one-half hour).

Figure 4:
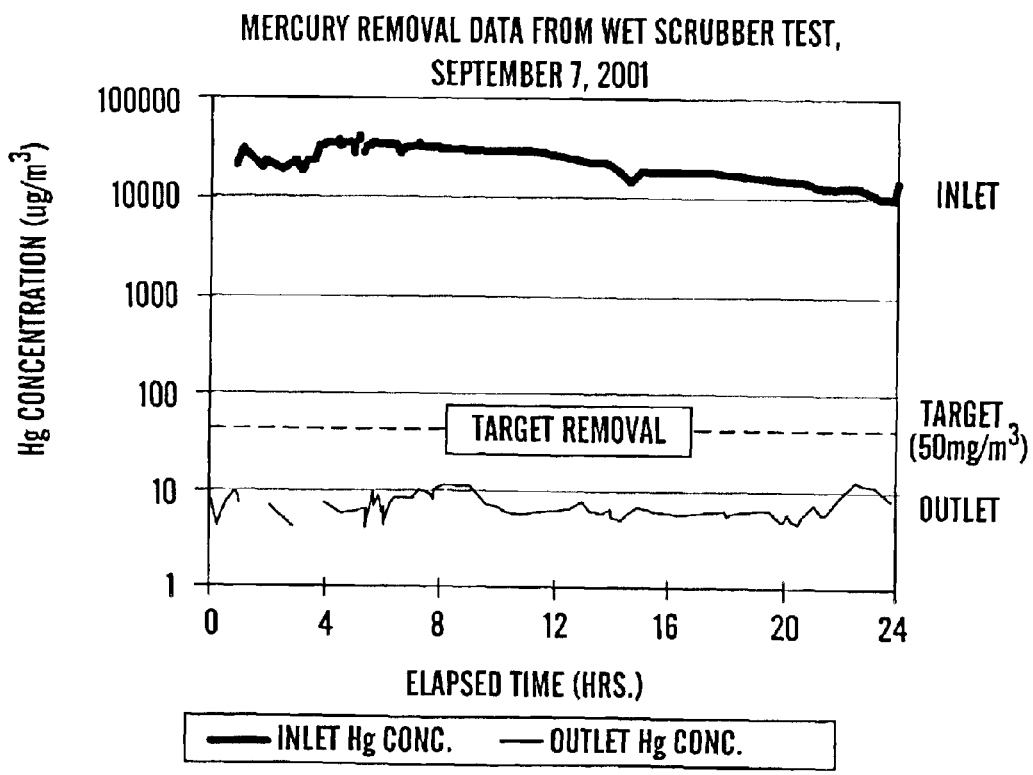
FIG. 4 is a graph depicting mercury removal data from a scrubber test.

For typical tests, mercury measurements were made at the inlet, and outlet of the mercury control device under evaluation. A continuous emissions monitor was fitted with a dilution system and used to measure inlet mercury concentration, with data points recorded to a computer file every 30 seconds. A second instrument to measure mercury concentrations at the outlet from the control device, with data points recorded every 15 seconds. These data flies were then imported to a spreadsheet file, so that the two data streams could be plotted side-by-side for comparison and analysis. A typical plot is shown below in FIG. 4, this one from the second test of the wet scrubber system. The plots present the time history of mercury removal in the test, with mercury concentration plotted on the vertical (logarithmic) scale. The dotted flat line shows the target outlet mercury concentration of 50 micrograms per cubic meter. The inlet concentration is seen to vary between 10,000 and 34,000 micrograms per cubic meter, while the outlet is seen to be fairly constant, hovering about the ten microgram per cubic meter level. A key result that is shown in this graph is that the outlet mercury concentration was constant in spite of a factor of three change in the inlet mercury loading in overnight operation, indicating that the performance of the invention does not depend on inlet loading, but is rather a function of the reagent concentration in the scrubber solution. Later testing confirmed this performance advantage. Conventional sorption systems such as activated carbon cannot duplicate this performance, and in fact, outlet concentrations tend to rise as the inlet mercury loading rises, and as the carbon becomes saturated with mercury.

Other issues to be tested included the minimum reagent concentration that was effective in scrubbing the mercury to target levels, the highest gas-to-liquid ratio (or, alternatively stated, the lowest liquid-to-gas ratio) that could be incorporated in the design of a full scale system while achieving the target outlet mercury concentration, and the evaluation of alternate scrubber reagents that may show cost or performance advantages over the baseline sodium hypochlorite.

Figure 5:
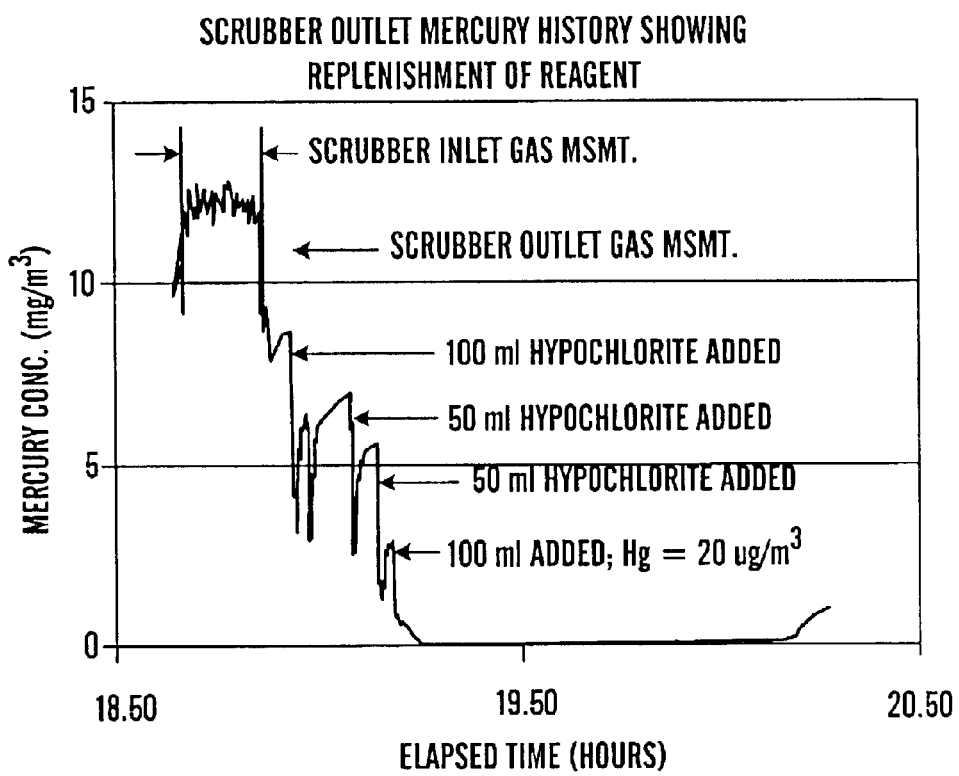
FIG. 5 is a graph depicting scrubber outlet mercury history showing replenishment of reagent.

One topic of interest in operation of the wet scrubber system was the point at which the efficacy of the reagent in the scrubber liquor began to drop due to its depletion from the solution. In order to evaluate this, several tests were run. The replenishment of reagent is illustrated in FIG. 5, which shows the mercury concentration on a linear vertical scale, with an initial short sampling period at the inlet to the scrubber, showing inlet mercury loading of over 12 milligrams per cubic meter. The measurement was then switched to the scrubber outlet, and a series of additions of sodium hypochlorite reagent was made to the scrubbing liquor. The impact of each addition is seen in the outlet mercury measurements, where the mercury concentration drops until virtually all the mercury is being scrubbed from the kiln off gas. At this optimum reagent concentration, the mercury concentration is less than 0.020 milligrams (20 micrograms) per cubic meter. The sum of these reagent additions brought the hypochlorite concentration in the scrubbing liquor to 0.10%, a very dilute solution. This test showed that removal of mercury from the gas stream is indeed due to a reaction with the reagent in the scrubbing liquor, and that periodic additions of the reagent concentration in the scrubber are required for steady-state operation the scrubbing process.

A later test demonstrated the robustness and ease of operation of the system. The test was run for an extended period until the scrubbing reagent was exhausted and the outlet concentration increased to greater than 50 $\mu g/m^3$. More hypochlorite was then added to the scrubbing liquor. The outlet gas mercury concentration was monitored throughout the test. The results showed the outlet mercury concentration remained below the target 50 $\mu g/m^3$ until the reagent was exhausted, at which point the mercury concentration at the scrubber outlet gas rapidly increased. Upon addition of sufficient hypochlorite to elevate the concentration in the scrubber liquor above 0.1%, the outlet mercury concentration rapidly decreased to below the target. This test conclusively showed that the system can operate with minimum attention and high mercury removal efficiency, provided the hypochlorite concentration is maintained, preferably above 0.1%. In the event that the hypochlorite concentration falls below about 0.1%, target mercury control levels can be recovered within minutes by adding more hypochlorite to the scrubbing liquor.

Figure 6:
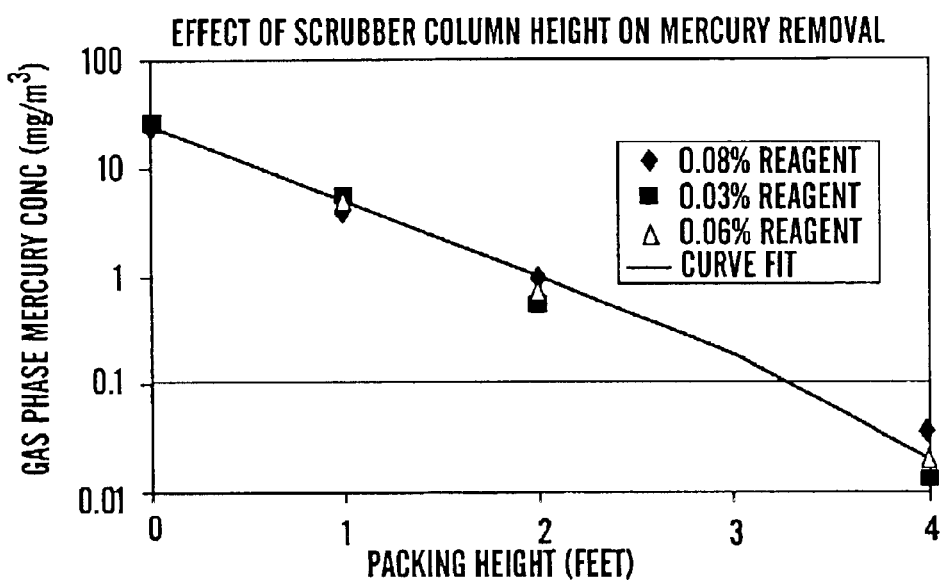
FIG. 6 is a graph depicting test results regarding the effect of scrubber column height on mercury removal.

Once the efficacy of the invention was established in the first few tests of the matrix, mercury concentration monitoring was performed at intermediate heights in the scrubber column packing to determine the active region of the column and the minimum height needed to achieve the target outlet mercury concentration of 50 $\mu g/m^3$. Data were obtained for three different hypochlorite concentrations, and are shown plotted in FIG. 6. Here, the mercury concentration is plotted on a log scale as a function of packed column height. The graph shows that about 80% of the mercury is removed in the first foot of the tower, and about 95% has been reacted with the scrubbing liquor by the top of the second foot of packing. To reach the target emissions level, however, the full four feet of packing was required.

Figures 7, 8:
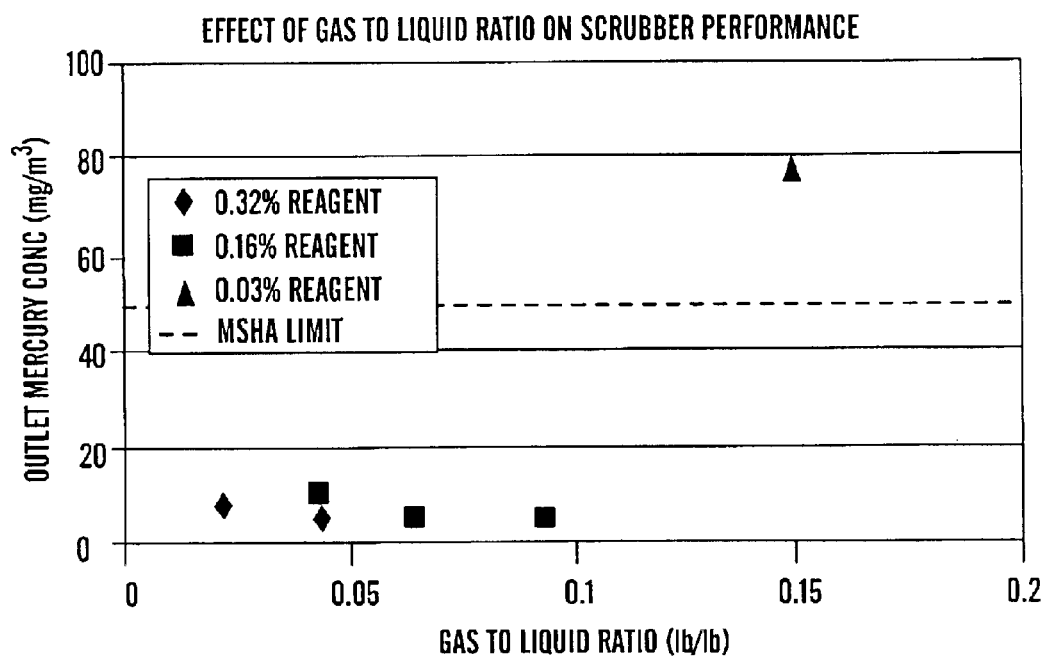
FIG. 7 is a chart depicting the predicted performance of a full scale wet scrubber system.
FIG. 8 is a graph depicting test results regarding the effect of gas to liquid ratio on scrubber performance.

These pilot-scale results were translated to full-scale system performance predictions that are presented in FIG. 7. Predictions are shown for three scrubber inlet mercury concentrations, which correspond to minimum, maximum, and typical temperatures for the kiln off gas to be treated by the invention. Values for scrubber outlet mercury concentrations (in micrograms per cubic meter) are indicated for half-height and full-height scrubber configurations. In the final column, the annual mercury emissions in the kiln are tabulated, showing that the present discharge of 659 lb can be reduced to less than one pound with the use of the wet scrubber. These predictions show quite dramatically the reduction in mercury emissions afforded by the invention when applied to carbon regeneration kiln off gas.

The test matrix was configured to collect scrubber performance data for a number of different concentrations of reagent in the scrubbing liquor and for a range of gas to liquid ratios of the scrubber. The gas to liquid ratios were changed in two ways: first, by changing the pump recirculation rate, spraying more or less liquor into the column; and second, by changing the gas feed rate to the column. The gas to liquid ratio is calculated by converting the gas volumetric flow rate to a mass flow, making a similar conversion of the liquid flow, and dividing the gas mass flow by the liquid mass flow. Tests were run over a range of approximately seven in the pilot test matrix. Results from several hypochlorite tests are shown in FIG. 8. Here, the graph plots measured mercury concentration at the scrubber outlet against the gas to liquid ratio. With increasing gas to liquid ratio, the scrubber size to achieve a fixed outlet mercury concentration is reduced. Thus the desired gas to liquid ratio on this graph is the highest value that meets the target outlet mercury concentration. The graph shows that a gas to liquid ratio of about 0.1 should be the baseline design condition if a hypochlorite reagent is used. These results further imply that the 0.03% concentration of the hypochlorite solution is too dilute to reach the target outlet mercury level.

Figures 9, 10:
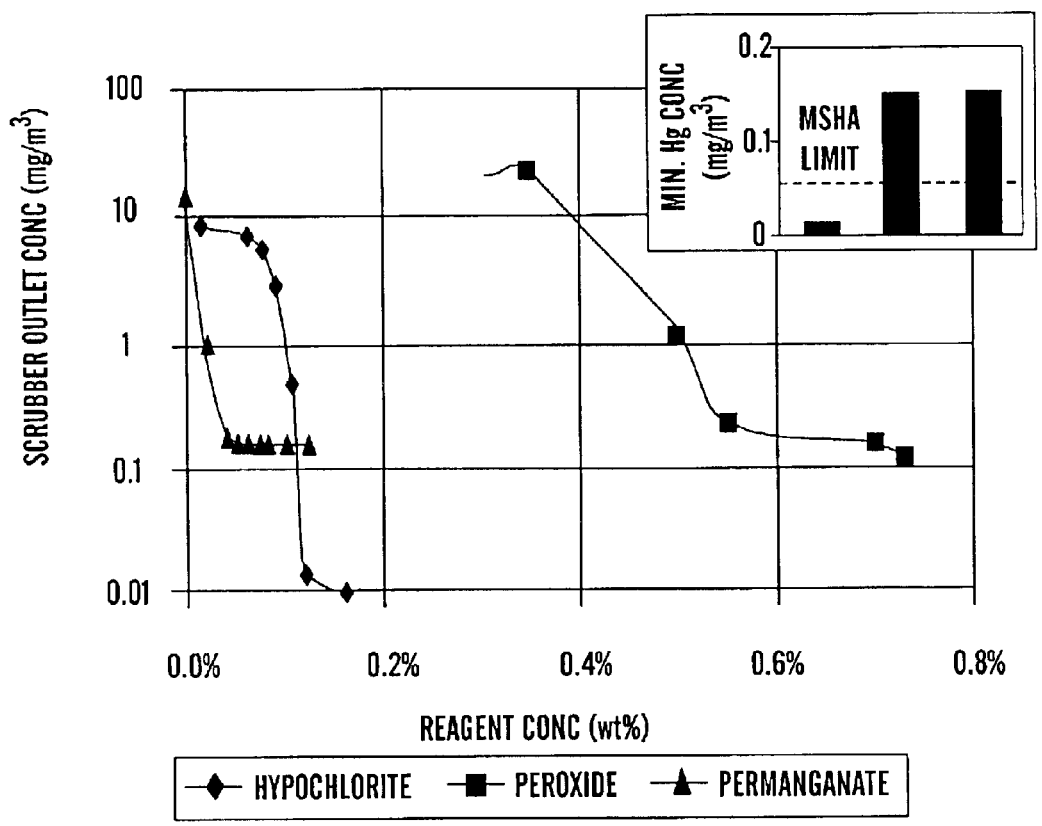
FIG. 9 is a graph depicting test results regarding the comparison of oxidizing reagents.
FIG. 10 is a chart depicting results from leachate testing.

Another topic of interest in the pilot testing was the evaluation of two alternative reagents to oxidize and remove the mercury in the scrubber, namely, hydrogen peroxide, ($H_2O_2$) and potassium permanganate ($KMNO_4$). Results from these tests are compared to the hypochlorite data in FIG. 9. Data for each of the reagents were obtained by adding incremental amounts, typically 50 to 100 milliliters, to the five gallons of scrubbing liquor circulating in the packed tower. With each addition, a measurement of the outlet mercury concentration was made, and the results recorded along with the corresponding reagent concentration calculated for the incremental addition. More reagent was then added, and another data point obtained, until the mercury removal met the target outlet concentration level, or until the maximum removal level appeared to have been reached, i.e., the addition of more reagent did not result in any additional mercury removal. FIG. 9 presents several noteworthy features of this data set. First, the permanganate showed the best performance in terms of mercury removal at the lowest concentration in the scrubbing liquor. Evaluated on this basis, the hydrogen peroxide was the worst, and the sodium hypochlorite fell between the two. The hypochlorite, however, was the only one of the reagents that was capable of achieving outlet gas mercury concentrations less than the target level of 50 $\mu g/m^3$; the minimum mercury concentrations measured for the other two reagents appeared to plateau around 150 $\mu g/m^3$. This is shown in greater detail in the insert bar graph of FIG. 9. The other important result to be cited in this graph is the relatively steep curve defined by the hypochlorite data. This shows that there is a very definite minimum concentration for the hypochlorite needed to achieve the target outlet mercury concentration, and that it is around 0.1%.

In summary, the pilot scrubber proved to be simple to operation, reliable and rugged. It removed more than 99.9% of the inlet mercury concentrations of 6–34 mg/m$^3$, resulting in outlet concentrations that were consistently below 0.020 mg/m$^3$. Other data show that a 4 ft. packed bed depth was needed to reach the 99.9% removal rate required to meet the target outlet mercury concentration. The excellent results were indicative of adequate gas/liquid contact in the pack tower. As shown by these results, wet scrubbing is well-understood technology that can be scaled up with confidence by those in the industry to the size needed to treat the entire carbon regeneration kiln off gas flow in commercial application.

Fourteen tests were run in the wet scrubber pilot to evaluate process and pack tower configuration parameters for optimization of a full scale design. The scrubber pilot showed high efficiency mercury removal for a range of inlet mercury loadings, gas to liquid ratios and scrubbing liquor reagent concentrations. In virtually every test condition, the scrubber removed mercury to less than 0.050 mg/m$^3$. For example, three candidate oxidation reagents were evaluated, with sodium hypochlorite (household bleach) emerging as the most effective. When operated with hypochlorite, the pilot scrubber was consistently achieve outlet mercury concentrations below the target level of 0.050 mg/m$^3$. Testing also revealed that a minimum reagent concentration of 0.10 hypochlorite in the scrubber liquor was needed to achieve the target outlet mercury concentration. This represents an extremely dilute solution and projects a significant cost savings in commercial applications. Also, in additional tests, the scrubber was able to accommodate short-term spikes in the few tens of minutes at inlet mercury loadings as high as 100 mg/m$^3$. This demonstrated the ability of the invention to accommodate variation in the inlet mercury loading and maintain constant outlet mercury levels.

Further, in a second process step conducted off-line of the first, mercuric oxide generated in the scrubber was successfully converted to mercuric sulfide, an even more insoluble solid form of mercury. The mercuric sulfide solid was shown to pass when subjected to a TCLP test. That is, the leachate was measured to contain less than the permissible 200 mg/l of soluble mercury. Additional testing in cyanide doped leach waters showed less than 0.02% mercury leached from the stable solid reaction product.

FIG. 1 depicts one embodiment of a process flow description and a design specification based on the results of the pilot testing and additional lab work on the secondary mercury stabilization process that is used to convert the mercuric oxide reaction product in the scrubbing liquor to a much less soluble mercuric sulfide. This insoluble compound passes a standard TCLP analysis, and therefore is considered a non-hazardous wastes. The conversion is a batch process that would be performed on a periodic basis, treating the concentrated slurry removed from the scrubbing liquor in the recycle loop. The treated slurry will then be pumped to the site tailings pond for disposal. Laboratory tests showed that the mercuric sulfide remained in solid form, with only 0.02% of mercury leached into the liquid phase when tested with pond water containing 30 ppm cyanide. Thus, as shown in FIG. 1, a preferred full-scale system would consist of two major scale systems: the packed-bed scrubber and a mercuric oxide reaction vessel.

The scrubber liquid from Test 10 was tested for stabilization and chemical analysis. Samples were drawn from the as-received liquid to assess the concentration of mercury. Scrubber liquor was found to have a mercury concentration of 488 micrograms/milliliter, which scales to about 10 grams of mercury in the 5-gallon scrubber liquor charge of the pilot unit. A mercury mass balance on the liquid corresponded to a 21 hours longevity test with an average inlet mercury concentration of 26 milligrams/m$^3$ in the feed gas, which compares quite well with the Test 10 conditions.

The scrubber liquid was stabilized in which the mercuric oxide in the scrubber liquor was converted to mercuric sulfide. Mercury solids were separated from the supernate liquid following the treatment. Samples of both the liquid and solids were analyzed for free mercury. The liquid samples had an average mercury concentration of 12 parts per billion, reflecting the extremely low solubility of mercuric sulfide and efficiency of the stabilization process. Standard TCLP analysis of the solids resulted in 0.1 mg soluble mercury /kg of solids and showed that the solids passed the TCLP limit for soluble mercury (0.2 mg/kg).

To conduct leaching tests for the stabilized mercury solids, leaching liquids were prepared by spiking pond water with a freshly made sodium cyanide stock solution in concentrations of 30 and 30 ppm CN$^-$. The leaching procedure was modified slightly by using 1 gram of mercury solids in 100 ml of cyanide solution. Tumbling time was the same as the standard TCLP at 18±½ hours. Analysis of the leachates for the 30 and 300 ppm cyanide solutions showed leachable mercury of 27 and 868 ppm, respectively. Details of the analytical results are presented in FIG. 10. These results indicate that even in the tailings pond water with 30 ppm cyanide, the mercury remains in solid form, with only 0.02% leached back into the water in laboratory tests.

A number of variations and modifications of the invention can be used. It would be possible to provide for some features of the invention without providing others.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A scrubber for removing mercury from a gas stream, comprising:

a gas scrubbing zone operable to contact a scrubbing solution with the gas stream to form a mercury-containing precipitate in a mercury-containing solution, wherein the mercury-containing solution comprises at least most of the mercury in the gas stream and the mercury-containing precipitate comprises predominantly mercury and oxygen; and a collection zone operable to collect the mercury-containing solution, wherein in the mercury-containing solution at least most of the mercury is in the form of a precipitate.

2. The scrubber of claim 1, wherein the mercury in the gas stream comprises speciated mercury.

3. The scrubber of claim 1, wherein the partial pressure of the mercury in the gas stream is at least about $7 \times 10^{-6}$ mmHg (100 $\mu$g/m$^3$).

4. The scrubber of claim 2, wherein the speciated mercury is selected from the group consisting essentially of mercuric chloride, mercuric sulfate, mercuric nitrate and mercuric oxide.

5. The scrubber of claim 1, wherein the scrubbing solution comprises an oxygen-containing oxidant and the precipitate is a compound comprising predominantly HgO.

6. The scrubber of claim 5, wherein the oxidant is selected from the group consisting essentially of a peroxygen compound, a hypochlorite, a chlorate, a perchlorate, a persulfate, iodine, iodide, iodate, hypoiodite, periodate, hydrogen peroxide, and permanganate.

7. The scrubber of claim 5, wherein the oxidant is sodium hypochlorite.

8. The scrubber of claim 5, wherein the concentration of the oxidant in the scrubbing solution ranges from about 0.1 to about 1.0 wt. %.

9. The scrubber of claim 1, wherein the gas scrubbing zone comprises a packing material to provide surface area for the contact of the gas stream with the scrubbing solution.

10. The scrubber of claim 1, wherein the gas stream and the scrubbing solution are introduced into the gas scrubbing zone so as to flow countercurrently therethrough.

11. A process for removing mercury from a gas stream, comprising:

(a) contacting a scrubbing solution with a mercury-containing gas stream to form a mercury-containing precipitate in a mercury-containing solution and a treated gas stream, the mercury-containing precipitate comprising predominantly mercury and oxygen; and (b) collecting the mercury-containing solution, wherein the mercury-containing solution contains at least most of the mercury from the mercury-containing gas stream and, in the mercury-containing solution, at least most of the mercury is in the form of a precipitate.

12. The process of claim 11, wherein the mercury in the mercury-containing gas stream is selected from the group consisting essentially of elemental mercury, speciated mercury and mixtures thereof.

13. The process of claim 11 wherein the mercury-containing gas stream comprises speciated mercury.

14. The process of claim 13, wherein the speciated mercury is selected from the group consisting essentially of mercuric chloride, mercuric sulfate, mercuric nitrate, mercuric oxide, and mixtures thereof.

15. The process of claim 14, wherein the partial pressure of the mercury-containing compounds in the gas stream is at least about $7 \times 10^{-6}$ mmHg (100 $\mu$g/m$^3$).

16. The process of claim 12, wherein the scrubbing solution comprises an oxygen-containing oxidant and the precipitate is a compound comprising predominantly HgO.

17. The process of claim 16, wherein the oxidant is selected from the group consisting essentially of a peroxygen compound, a chlorate, and mixtures thereof.

18. The process of claim 16, wherein the oxidant is a peroxygen compound and the peroxygen compound is selected from the group consisting essentially of a peroxide, a persulfate, a perchlorate, a periodate, hydrogen peroxide, permanganate and mixtures thereof.

19. The process of claim 16, wherein the oxidant comprises a hypochlorite and the concentration of the oxidant in the scrubbing solution ranges from about 0.1 to about 1.0 percent by weight.

20. The process of claim 11, wherein, in the contacting step (a), the gas stream and the scrubbing solution flow countercurrently through a scrubber.

21. The process of claim 16, wherein in the contacting step (a) the pH of the scrubbing solution is above approximately pH9.

22. The process of claim 21, further comprising:

(c) contacting a base with the scrubbing solution to maintain the pH in the desired range.

23. The process of claim 11, wherein the ratio of the gas stream to the scrubbing solution ranges from about 0.07 to about 0.2.

24. The process of claim 11, further comprising:

(c) removing the mercury-containing precipitates from the mercury-containing solution to form a treated scrubbing solution and a removed mercury-containing slurry.

25. The process of claim 24, further comprising:

(d) recycling the treated scrubbing solution to the contacting step and wherein the slurry comprises at least most of the mercury-containing precipitates in the mercury-containing solution.

26. The process of claim 24, wherein the slurry comprises an oxygen-containing oxidant and further comprising:

(d) contacting the removed mercury-containing slurry with a reductant to neutralize at least most of the oxidant in the slurry to form a reduced slurry.

27. The process of claim 26, wherein the reductant is selected from the group consisting essentially of oxalic acid, sodium sulfite, sodium hydrosulfite, and mixtures thereof.

28. The process of claim 27, wherein the molar ratio of the reductant to the oxidant is at least about 1:1.

29. The process of claim 26, wherein in contacting step (d) the pH of the slurry ranges from about pH 9 to about pH 11.

30. The process of claim 26, further comprising:

(e) contacting the reduced slurry with a mercury-reactive sulfur-containing material to convert at least most of the mercury into a compound comprising mercury and sulfur and to form a treated slurry.

31. The process of claim 30, wherein the mercury-reactive sulfur-containing material is selected from the group consisting essentially of a polysulfide, a sulfide other than a polysulfide, and mixtures thereof.

32. The process of claim 30, wherein in contacting step (e) the pH of the reduced slurry ranges from about pH 5.5 to about pH 7.5.

33. The process of claim 30, wherein the mercury reactive material is a compound of sulfur and further comprising:

(f) contacting the treated slurry with a sulfide scavenger to convert at least most of the unreacted mercury reactive material into a substantially nonreactive sulfur-containing material and form a further treated slurry.

34. The process of claim 33, wherein the sulfide scavenger is selected from the group consisting essentially of a metal salt, ferrous sulfate, ferric sulfate, cuprous sulfate, cupric sulfate, ferric chloride, ferrous chloride, stannic chloride, stannous chloride, cupric chloride, cuprous chloride and mixtures thereof.

35. The process of claim 34, wherein the treated slurry during contacting step (f) has a pH ranging from about pH 5.5 to about pH 7.5.

36. The process of claim 33, further comprising:
separating at least most of the compounds of mercury and sulfur from the further treated slurry.

37. The process of claim 11, wherein the partial pressure of mercury-containing compounds in the treated gas stream is no more than about $8.9 \times 10^{-3}$ mmHg (90 mg/m$^3$).

38. A system for stabilizing mercury in a mercury-containing gas stream, comprising:
  (a) a scrubber having:
    (i) a gas scrubbing zone operable to contact a scrubbing solution with the gas stream to form a mercury-containing precipitate in a mercury-containing solution, wherein the mercury-containing solution comprises at least most of the mercury in the gas stream, and the mercury-containing precipitate comprises predominantly a compound of mercury and oxygen; and
    (ii) a collection zone operable to collect the mercury-containing solution, wherein, in the mercury-containing solution, at least most of the mercury is in the form of a precipitate;
  (b) a solid/liquid separator operable to separate the mercury-containing precipitates from the mercury-containing solution; and
  (c) a mercury stabilization reactor operable to convert the recovered mercury-containing precipitates into a compound of mercury and sulfur.

39. The system of claim 38, wherein the mercury in the gas stream is selected from the group consisting essentially of elemental mercury, speciated mercury, and mixtures thereof.

40. The system of claim 39, wherein the partial pressure of the mercury in the gas stream is at least about $3 \times 10^{-3}$ mmHg (30 mg/m$^3$).

41. The system of claim 38, wherein the mercury comprises speciated mercury selected from the group consisting essentially of mercuric chloride, mercuric sulfate, mercuric nitrate, and mercuric oxide.

42. The system of claim 38, wherein the scrubbing solution comprises an oxygen-containing oxidant and the precipitate is a compound comprising predominantly HgO.

43. The system of claim 42, wherein the oxidant is at least one of a peroxygen compound, a hypochlorite, a chlorate, a perchlorate, a persulfate, iodine, iodide, iodate, hypoiodite, periodate, hydrogen peroxide, and permanganate.

44. The system of claim 42, wherein the oxidant is a peroxygen compound that is at least one of a peroxide, a persulfate, a perchlorate, a periodate and hydrogen peroxide.

45. The system of claim 42, wherein the oxidant is a hypochlorite and the concentration of the oxidant in the scrubbing solution ranges from about 0.1 to about 1.0 percent by weight.

46. The system of claim 38, wherein the gas scrubbing zone comprises a packing material to provide surface area for the contact of the gas stream with the scrubbing solution.

47. The system of claim 38, wherein the gas stream and the scrubbing solution are introduced into the gas scrubbing zone so as to flow countercurrently therethrough.

48. The system of claim 38, wherein the compound of mercury and sulfur is HgS.

49. The system of claim 48, wherein in the mercury stabilization reactor a mercury-reactive sulfur-containing material is contacted with the mercury-containing precipitates and the mercury-reactive sulfur-containing material is selected from the group consisting essentially of a polysulfide, a sulfide other than a polysulfide, and mixtures thereof.

50. In a scrubber for removing mercury from a mercury-containing gas stream, an aqueous scrubbing solution comprising:
at least about 0.1 percent by weight of an oxygen-containing oxidant in a solution having a pH of over approximately pH 9 to convert the mercury to a substantially insoluble compound of mercury and oxygen.

51. The aqueous scrubbing solution of claim 50, further comprising base solution to maintain the pH over approximately pH 9.

52. The aqueous scrubbing solution of claim 50, wherein the concentration of the oxidant ranges from about 0.1 to about 0.5 percent by weight and wherein the oxidant is selected from the group consisting essentially of a peroxygen compound, a hypochlorite, a chlorate, a perchlorate, a persulfate, iodine, iodide, iodate, hypoiodite, periodate, hydrogen peroxide, and permanganate.

53. A process for stabilizing mercury in a mercury-containing gas stream, comprising:
  (a) contacting a mercury-containing gas stream with a scrubbing solution to form a treated gas stream and a mercury-containing solid in a mercury-containing solution, the mercury-containing solution comprising at least most of the mercury in the mercury-containing gas stream and the mercury-containing solid comprising predominantly a compound of mercury and oxygen; and
  (b) converting at least most of the mercury in the mercury-containing solution into a compound of mercury and sulfur.

54. The process of claim 53, wherein, after step (a) and before step (b), at least most of the mercury in the mercury-containing solution is in the form of a solid.

55. The process of claim 53, wherein, after step (a) and before step (b), at least most of the mercury in the mercury-containing solution is in the form of HgO.

56. The process of claim 54, further comprising after step (b):
  (c) separating at least most of the mercury from the mercury-containing solution to form a mercury-containing slurry and a treated scrubbing solution;
  (d) recycling the treated scrubbing solution to step (a); and
  (e) contacting the mercury-containing slurry with a mercury reactive material to form the compound of mercury and sulfur.

57. The process of claim 53, wherein the scrubbing solution comprises at least about 0.1 percent by weight of an oxygen-containing oxidant.

\* \* \* \* \*